United States Patent
Oshima et al.

(10) Patent No.: US 10,476,311 B2
(45) Date of Patent: Nov. 12, 2019

(54) POWER RECEIVER AND POWER TRANSMITTING SYSTEM

(71) Applicant: FUJITSU LIMITED, Kawasaki-shi, Kanagawa (JP)

(72) Inventors: Hirotaka Oshima, Machida (JP); Satoshi Shimokawa, Kawasaki (JP); Akiyoshi Uchida, Akashi (JP)

(73) Assignee: FUJITSU LIMITED, Kawasaki (JP)

( * ) Notice: Subject to any disclaimer, the term of this patent is extended or adjusted under 35 U.S.C. 154(b) by 160 days.

(21) Appl. No.: 15/821,300

(22) Filed: Nov. 22, 2017

(65) Prior Publication Data

US 2018/0097407 A1 Apr. 5, 2018

Related U.S. Application Data

(63) Continuation of application No. PCT/JP2015/066225, filed on Jun. 4, 2015.

(51) Int. Cl.
*H02J 50/12* (2016.01)
*H02J 5/00* (2016.01)
(Continued)

(52) U.S. Cl.
CPC ............. *H02J 50/12* (2016.02); *H02J 5/005* (2013.01); *H02J 50/40* (2016.02); *H02M 7/06* (2013.01)

(58) Field of Classification Search
None
See application file for complete search history.

(56) References Cited

U.S. PATENT DOCUMENTS

2011/0006612 A1 1/2011 Kozakai
2013/0147281 A1* 6/2013 Kamata ............... H02J 17/00
307/104
(Continued)

FOREIGN PATENT DOCUMENTS

JP 2004-072832 3/2004
JP 2011-019291 A 1/2011
(Continued)

OTHER PUBLICATIONS

International Search Report for International Application No. PCT/JP2015/066225 dated Aug. 18, 2015.
(Continued)

*Primary Examiner* — Jared Fureman
*Assistant Examiner* — Aqeel H Bukhari
(74) *Attorney, Agent, or Firm* — Kratz, Quintos & Hanson, LLP

(57) ABSTRACT

A power receiver includes: a secondary-side resonant coil configured to receive electric power from a primary-side resonant coil through magnetic field resonance generated; a capacitor inserted in series in a resonant coil part of the secondary-side resonant coil; a series circuit, coupled in parallel with the capacitor, of a first switch and a second switch; a first rectifier coupled in parallel with the first switch, the first rectifier having a first rectification direction; a second rectifier coupled in parallel with the second switch and having a second rectification direction; a detector configured to detect the electric power received by the secondary-side resonant coil; and a controller configured to adjust phases of a first signal for switching on/off the first switch and of a second signal for switching on/off the second switch to adjust an amount of the electric power received by the secondary-side resonant coil.

11 Claims, 29 Drawing Sheets

(51) Int. Cl.
*H02M 7/06* (2006.01)
*H02J 50/40* (2016.01)

(56) References Cited

U.S. PATENT DOCUMENTS

| | | | | |
|---|---|---|---|---|
| 2014/0265610 A1* | 9/2014 | Bakker | ................ | H04B 5/0037 |
| | | | | 307/104 |
| 2015/0008736 A1 | 1/2015 | Uchida | | |
| 2015/0180287 A1 | 6/2015 | Endo | | |
| 2015/0229132 A1 | 8/2015 | Katsunaga | | |
| 2015/0280792 A1* | 10/2015 | Chen | .................... | H04B 5/0037 |
| | | | | 307/104 |
| 2016/0064949 A1* | 3/2016 | Bai | ........................ | H02J 17/00 |
| | | | | 307/104 |

FOREIGN PATENT DOCUMENTS

| | | |
|---|---|---|
| JP | 2014-060863 A | 4/2014 |
| JP | 2014-082897 | 5/2014 |
| JP | 2014-093829 | 5/2014 |
| JP | 2014-155418 | 8/2014 |
| WO | 2013146929 A1 | 10/2013 |

OTHER PUBLICATIONS

Written Opinion of the International Searching Authority for International Application No. PCT/JP2015/066225 dated Aug. 18, 2015 (5 Sheets, 3 Sheets translation, 8 Sheets total).

\* cited by examiner

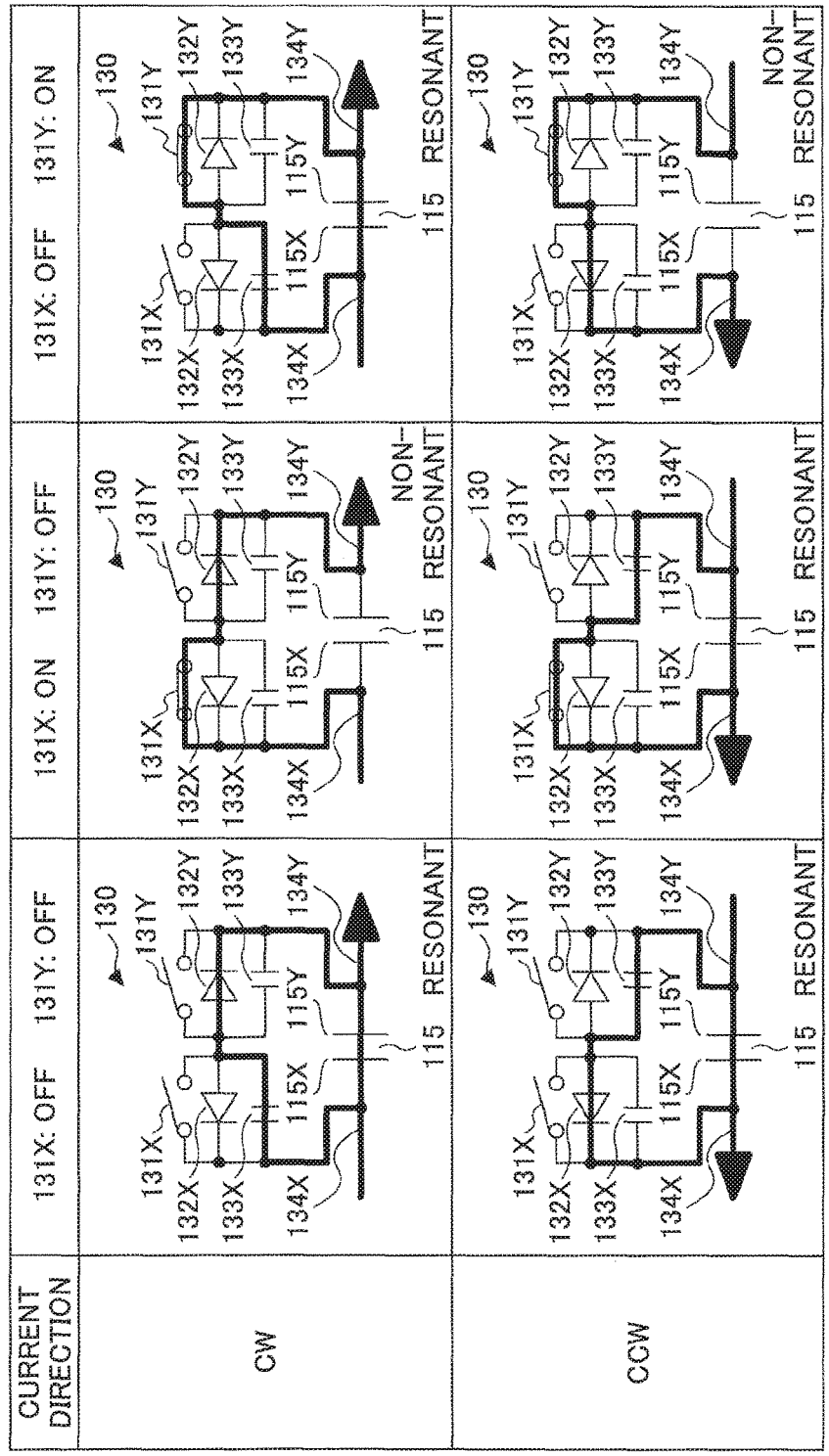

FREQUENCY DIFFERENCE IS NOT PRESENT

FREQUENCY DIFFERENCE IS PRESENT

LARGE FREQUENCY
DIFFERENCE

SMALL FREQUENCY
DIFFERENCE

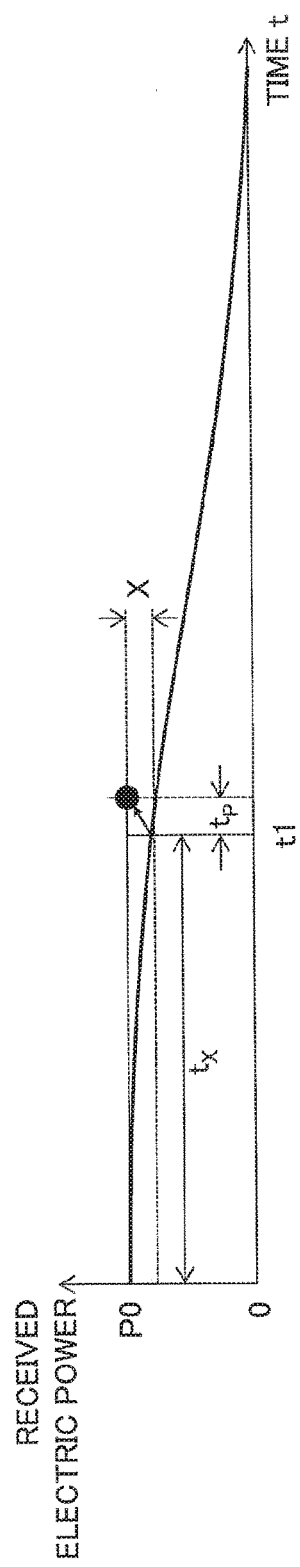

FIG.18A

| $M_{TB}$ \ $M_{TA}$ | $M_{TA1}$ | $M_{TA2}$ | $M_{TA3}$ | . . . |
|---|---|---|---|---|
| $M_{TB1}$ | PH1A | PH2A | PH3A | |
| $M_{TB2}$ | PH11A | PH12A | PH13A | |
| ⋮ | | | | |

FIG.18B

| $M_{TB}$ \ $M_{TA}$ | $M_{TA1}$ | $M_{TA2}$ | $M_{TA3}$ | . . . |
|---|---|---|---|---|
| $M_{TB1}$ | PH1B | PH2B | PH3B | |
| $M_{TB2}$ | PH11B | PH12B | PH13B | |
| ⋮ | | | | |

FIG.19A

| $M_{TA1}$ | $E_{A1}$ |
|---|---|
| $M_{TA2}$ | $E_{A2}$ |
| ⋮ | ⋮ |

FIG.19B

| $M_{TB1}$ | $E_{B1}$ |
|---|---|
| $M_{TB2}$ | $E_{B2}$ |
| ⋮ | ⋮ |

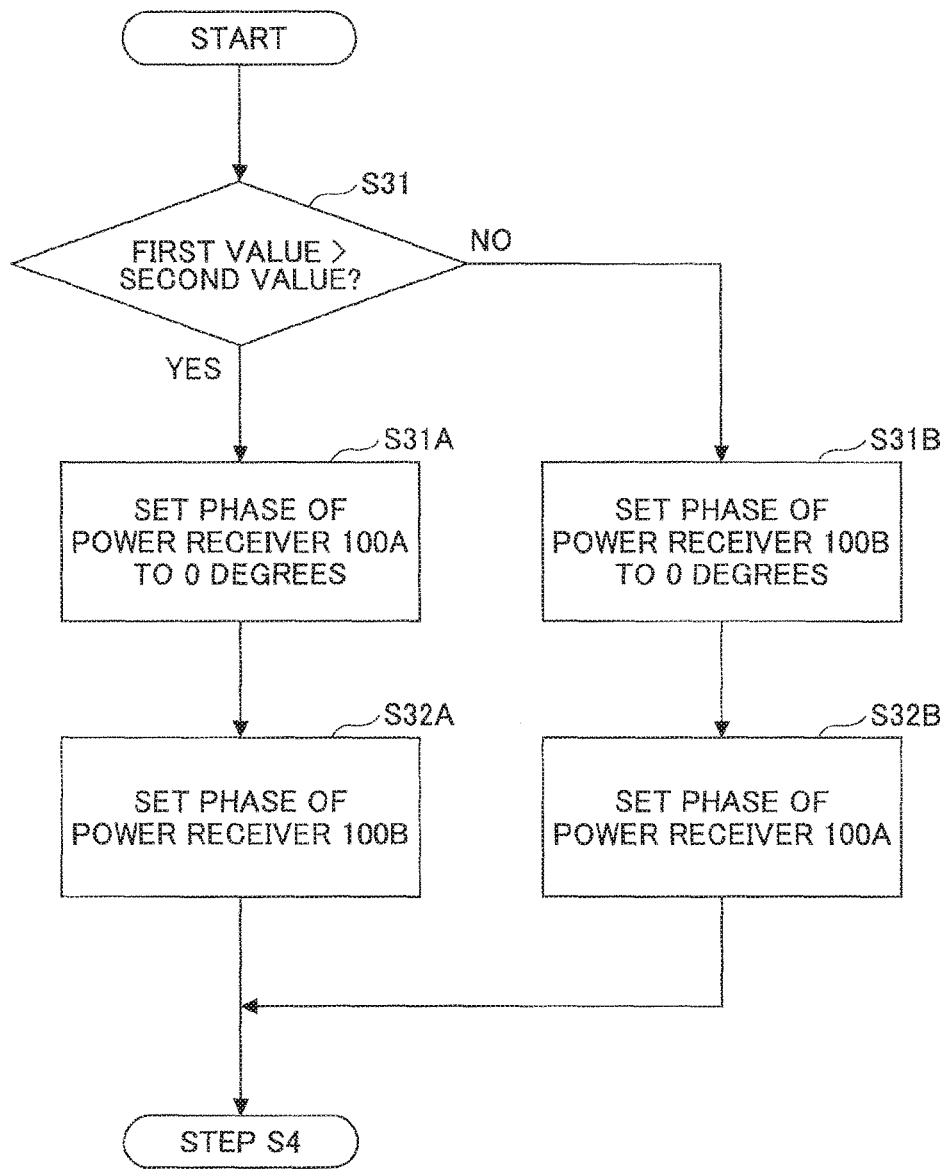

POWER RECEIVER AND POWER TRANSMITTING SYSTEM

CROSS-REFERENCE TO RELATED APPLICATION

This application is a continuation application of International Application PCT/JP2015/066225 filed on Jun. 4, 2015 and designated the U.S., the entire contents of which are incorporated herein by reference.

FIELD

The embodiments discussed herein relate to a power receiver and a power transmitting system.

BACKGROUND

Conventionally, there exists a contactless power receiving apparatus including: a resonance element adapted to receive supply of alternating-current power in a contactless fashion by resonance from a resonance element of a power supplying source; an excitation element adapted to receive supply of the alternating-current power by electromagnetic induction from the resonance element; a rectification circuit adapted to generate direct-current power from the alternating-current power from the excitation element and output the direct-current power; and a changeover circuit adapted to change over the alternating-current power to the rectification circuit between a supply state and a non-supply state (see Patent Document 1, for example).

Such a conventional contactless power receiving apparatus (power receiver) does not take into consideration adjustment of electric power received by a resonance element. If the electric power reception can be adjusted, it is possible to transmit electric power efficiently between a power transmitter and a power receiver.

RELATED-ART DOCUMENTS

Patent Documents

[Patent Document 1] Japanese Laid-open Patent Publication No. 2011-019291

SUMMARY

According to an aspect of the embodiments, a power receiver includes: a secondary-side resonant coil including a resonant coil part and configured to receive electric power from a primary-side resonant coil through magnetic field resonance generated between the primary-side resonant coil and the secondary-side resonant coil; a capacitor inserted in series in the resonant coil part of the secondary-side resonant coil; a series circuit, coupled in parallel with the capacitor, of a first switch and a second switch; a first rectifier coupled in parallel with the first switch, the first rectifier having a first rectification direction; a second rectifier coupled in parallel with the second switch, the second rectifier having a second rectification direction opposite to the first rectification direction; a detector configured to detect the electric power received by the secondary-side resonant coil; and a controller configured to adjust phases of a first signal for switching on/off the first switch and of a second signal for switching on/off the second switch to adjust an amount of the electric power received by the secondary-side resonant coil.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 6 is a diagram illustrating current paths in a capacitor and an adjuster;

FIG. 13 is a diagram illustrating a method of reducing effects of beats in the power receiver according to the first embodiment;

FIGS. 18A and 18B are diagrams illustrating table data that associates phases with relationships between mutual inductances $M_{TA}$ and mutual inductances $M_{TB}$;

FIGS. 19A and 19B are diagrams illustrating table data that associates efficiencies of electric power reception with the mutual inductances $M_{TA}$ and $M_{TB}$;

FIG. 20 is a flowchart illustrating a method by which the power transmitter sets the phases of the power receivers according to the first embodiment;

DESCRIPTION OF EMBODIMENT

Hereinafter, embodiments, to which power receivers and a power transmitting system of the present invention are applied, will be described. An object is to provide a power receiver and a power transmitting system that can adjust received electric power reception.

First Embodiment

Before describing a first embodiment to which power receivers and a power transmitting system of the present invention are applied, a technical premise of the power transmitting system and the power receivers according to the first embodiment is described with reference to FIGS. 1 to 3.

Figure 1:
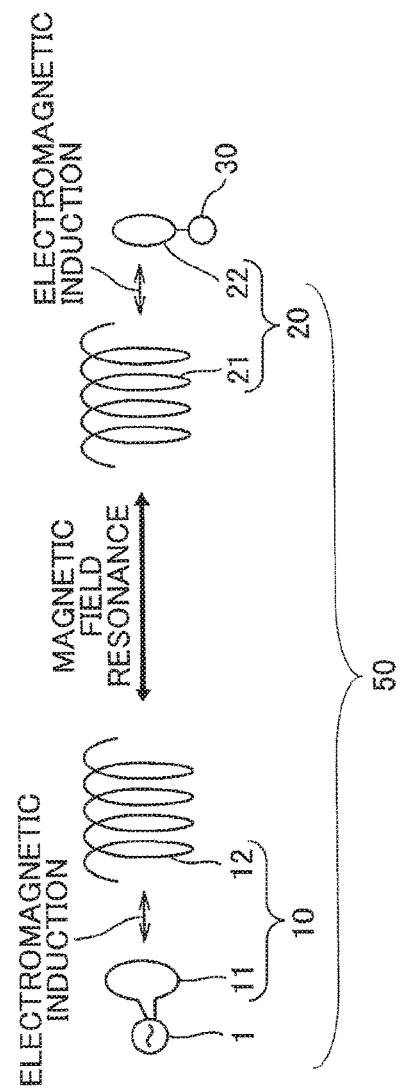
FIG. 1 is a diagram illustrating a power transmitting system.

FIG. 1 is a diagram illustrating a power transmitting system 50.

As illustrated in FIG. 1, the power transmitting system 50 includes an alternating-current (AC) power source 1, a primary-side (power transmitting side) power transmitter 10, and a secondary-side (power receiving side) power receiver 20. The power transmitting system 50 may include a plurality of power transmitters 10 and a plurality of power receivers 20.

The power transmitter 10 includes a primary-side coil 11 and a primary-side resonant coil 12. The power receiver 20 includes a secondary-side resonant coil 21 and a secondary-side coil 22. A load device 30 is coupled to the secondary-side coil 22.

As illustrated in FIG. 1, the power transmitter 10 and the power receiver 20 perform transmission of energy (electric power) from the power transmitter 10 to the power receiver 20 through magnetic-field resonance (magnetic-field sympathetic vibration) between the primary-side resonant coil (LC resonator) 12 and the secondary-side resonant coil (LC resonator) 21. Here, the electric power can be transmitted from the primary-side resonant coil 12 to the secondary-side resonant coil 21 by not only the magnetic-field resonance but also by electric field resonance (electric field sympathetic vibration) or the like. In the following description, the magnetic-field resonance will be mainly described as an example.

In the first embodiment, for example, a case is described where a frequency of an AC voltage that the AC power source 1 outputs is 6.78 MHz and a resonance frequency of the primary-side resonant coil 12 and the secondary-side resonant coil 21 is 6.78 MHz.

Note that the electric power transmission from the primary-side coil 11 to the primary-side resonant coil 12 is performed by utilizing electromagnetic induction. Also, the electric power transmission from the secondary-side resonant coil 21 to the secondary-side coil 22 is performed by utilizing electromagnetic induction.

Although FIG. 1 illustrates a configuration in which the power transmitting system 50 includes the secondary-side coil 22, the power transmitting system 50 is not required to include the secondary-side coil 22. In this case, the load device 30 may be directly coupled to the secondary-side resonant coil 21.

Figure 2:
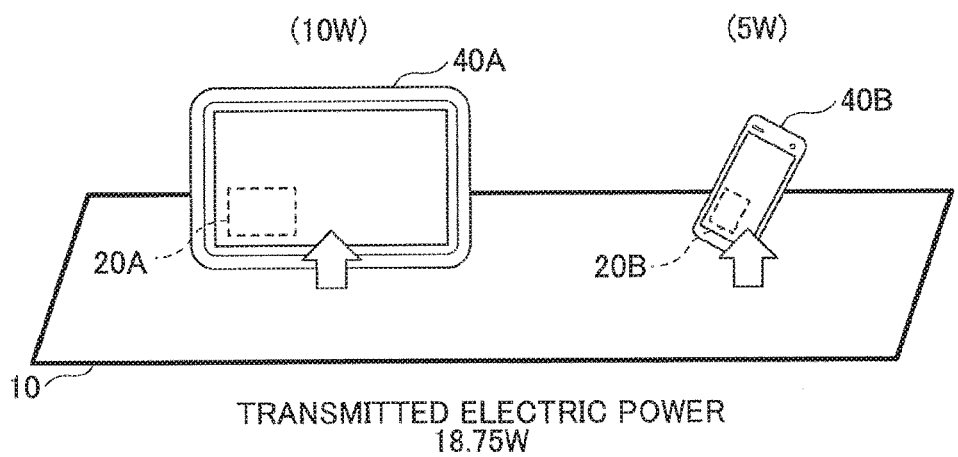
FIG. 2 is a diagram illustrating a state in which electric power is transmitted from a power transmitter to electronic devices through magnetic-field resonance.

FIG. 2 is a diagram illustrating a state where electric power is transmitted from the power transmitter 10 to electronic devices 40A and 40B through magnetic-field resonance.

The electronic devices 40A and 40B are a tablet computer and a smartphone, respectively, and include power receivers 20A and 20B, respectively. Each of the power receivers 20A and 20B has a configuration where the secondary-side coil 22 is removed from the power receiver 20 (see FIG. 1) illustrated in FIG. 1. That is, each of the power receivers 20A and 20B includes the secondary-side resonant coil 21. Note that although the simplified power transmitter 10 is illustrated in FIG. 2, the power transmitter 10 is coupled to the AC power source 1 (see FIG. 1).

In FIG. 2, each of the electronic devices 40A and 40B is arranged at an equal distance from the power transmitter 10. The power receivers 20A and 20B included in the respective electronic devices 40A and 40B simultaneously receive the electric power from the power transmitter 10 through the magnetic-field resonance in a non-contact state.

Here, for example, in a state illustrated in FIG. 2, an efficiency of electric power reception of the power receiver 20A included in the electronic device 40A is 40%, and an efficiency of electric power reception of the power receiver 20B included in the electronic device 40B is 40%.

The respective efficiencies of electric power reception of the power receivers 20A and 20B are expressed as ratios of electric power received by the secondary-side coils 22 of the power receivers 20A and 20B, with respect to electric power transmitted from the primary-side coil 11 coupled to the AC power source 1. Note that in a case where the primary-side resonant coil 12 is directly coupled to the AC power source 1 and the power transmitter 10 does not include the primary-side coil 11, the received electric power may be calculated by using electric power transmitted from the primary-side resonant coil 12 instead of using the electric power transmitted from the primary-side coil 11. In a case where the power receivers 20A and 20B do not include the secondary-side coil 22, received electric power may be calculated by using electric power received by the secondary-side resonant coil 21 instead of using the electric power received by the secondary-side coil 22.

The efficiency of electric power reception of the power receiver 20A and the efficiency of electric power reception of the power receiver 20B are determined depending on specifications of the coils of the power receivers 20A and 20B and of the power transmitter 10 and on distances/orientations between the power transmitter 10 and the respective power receivers 20A and 20B. In FIG. 2, because the power receivers 20A and 20B have the same configuration and are arranged at positions of equal distance/orientation from the power transmitter 10, the efficiency of electric power reception of the power receiver 20A and the efficiency of electric power reception of the power receiver 20B are equal to each other and, as an example, at 40%.

Further, a rated output of the electronic device 40A is taken as 10 W and a rated output of the electronic device 40B is taken as 5 W.

In such a case, electric power transmitted from the primary-side resonant coil 12 (see FIG. 1) of the power transmitter 10 is 18.75 W. Here, 18.75 W can be calculated by a formula of (10 W+5 W)/(40%+40%).

When electric power of 18.75 W is transmitted to the electronic devices 40A and 40B from the power transmitter 10, the power receivers 20A and 20B receive electric power of 15 W in total. Because the power receivers 20A and 20B equally receive the electric power, each of the power receivers 20A and 20B receives electric power of 7.5 W.

As a result, electric power to the electronic device 40A is insufficient by 2.5 W, and electric power to the electronic device 40B is excessive by 2.5 W.

That is, even when electric power of 18.75 W is transmitted from the power transmitter 10 to the electronic devices 40A and 40B, the electronic devices 40A and 40B cannot receive the electric power in a balanced manner. In other words, when the electronic devices 40A and 40B simultaneously receive electric power, the supply balance of electric power is not good.

Figure 3:
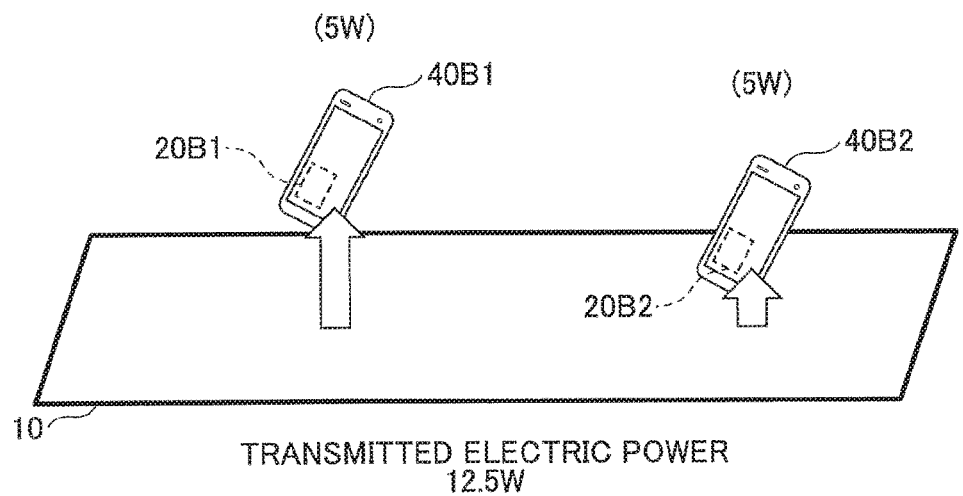
FIG. 3 is a diagram illustrating a state in which electric power is transmitted from the power transmitter to electronic devices through magnetic-field resonance.

FIG. 3 is a diagram illustrating a state where electric power is transmitted from the power transmitter 10 to electronic devices 40B1 and 40B2 through magnetic-field resonance.

The electronic devices 40B1 and 40B2 are the same type of smartphone and respectively include power receivers 20B1 and 20B2. Each of the power receivers 20B1 and 20B2 is equal to the power receiver 20B illustrated in FIG. 2. That is, each of the power receivers 20B1 and 20B2 includes the secondary-side resonant coil 21. Although a simplified power transmitter 10 is illustrated in FIG. 3, the power transmitter 10 is coupled to the AC power source 1 (see FIG. 1).

In FIG. 3, an angle (orientation) of the electronic device 40B1 with respect to the power transmitter 10 is equal to an angle (orientation) of the electronic device 40B2 with respect to the power transmitter 10. However, the electronic device 40B1 is arranged further away from the power transmitter 10 than the electronic device 40B2. The power receivers 20B1 and 20B2 included in the respective electronic devices 40B1 and 40B2 simultaneously receive electric power from the power transmitter 10 through the magnetic field resonance in a non-contact state.

For example, in the state illustrated in FIG. 3, an efficiency of electric power reception of the power receiver 20B1 included in the electronic device 40B1 is 35%, and an efficiency of electric power reception of the power receiver 20B2 included in the electronic device 40B2 is 45%.

Here, because the angle (orientation) of the electronic device 40B1 with respect to the power transmitter 10 and the angle (orientation) of the electronic device 40B2 with respect to the power transmitter 10 are equal to each other, the efficiency of electric power reception of the power receiver 20B1 and the efficiency of electric power reception of the power receiver 20B2 are determined depending on distances between the power transmitter 10 and the respective power receivers 20B1 and 20B2. Thus, in FIG. 3, the efficiency of electric power reception of the power receiver 20B1 is lower than the efficiency of electric power reception of the power receiver 20B2. Note that both the rated output of the electronic device 40B1 and the rated output of the electronic device 40B2 are 5 W.

In such a case, electric power transmitted from the primary-side resonant coil 12 (see FIG. 1) of the power transmitter 10 is 12.5 W. Here, 12.5 W can be calculated by a formula of (5 W+5 W)/(35%+45%).

When electric power of 12.5 W is transmitted to the electronic devices 40B1 and 40B2 from the power transmitter 10, the power receivers 20B1 and 20B2 receive electric power of 10 W in total. Further, because the efficiency of electric power reception of the power receiver 20B1 is 35%, and the efficiency of electric power reception of the power receiver 20B2 is 45% in FIG. 3, the power receiver 20B1 receives electric power of about 4.4 W and the power receiver 20B2 receives electric power of about 5.6 W.

As a result, electric power to the electronic device 40B1 is insufficient by about 0.6 W, and electric power to the electronic device 40B2 is excessive by about 0.6 W.

That is, even when electric power of 12.5 W is transmitted from the power transmitter 10 to the electronic devices 40B1 and 40B2, the electronic devices 40B1 and 40B2 cannot receive electric power in a balanced manner. In other words, when the electronic devices 40B1 and 40B2 simultaneously receive electric power, the supply balance of electric power is not good (has scope for improvement).

Here, in the above description of the supply balance of electric power, the angles (orientations) of the electronic devices 40B1 and 40B2 with respect to the power transmitter 10 are the same and the distances from the power transmitter 10 to the electronic devices 40B1 and 40B2 are different.

However, because the efficiencies of electric power reception are determined depending on the angles (orientations) and the distances between the power receivers 20B1 and 20B2 and the power transmitter 10, the efficiency of electric power reception of the power receiver 20B1 and the efficiency of electric power reception of the power receiver 20B2 become values different from the above described 35% and 45% when angles (orientations) of the electronic devices 40B1 and 40B2 are different from a positional relationship illustrated in FIG. 3.

The efficiency of electric power reception of the power receiver 20B1 and the efficiency of electric power reception of the power receiver 20B2 become different values from each other when angles (orientations) of the electronic devices 40B1 and 40B2, with respect to the power transmitter 10, are different even if the distances from the power transmitter 10 to the electronic devices 40B1 and 40B2 are equal to each other.

As described above, as illustrated in FIG. 2, when simultaneously transmitting electric power through magnetic field resonance from the power transmitter 10 to the electronic devices 40A and 40B of which rated outputs are different from each other, it is difficult for the electronic devices 40A and 40B to receive electric power in a balanced manner.

Also, as illustrated in FIG. 3, the efficiency of electric power reception of the power receiver 20B1 and the efficiency of electric power reception of the power receiver 20B2 are different from each other when angles (orientations) of the electronic devices 40B1 and 40B2, with respect to the power transmitter 10, are different even if the rated outputs of the electronic devices 40B1 and 40B2 are equal to each other. Therefore, it is difficult for the electronic devices 40A and 40B to receive electric power in a balanced manner.

Also, in the descriptions of the respective cases of FIG. 2 and FIG. 3, the electronic devices 40A and 40B and the electronic devices 40B1 and 40B2 receive the electric power at the same time. However, it is considered that a plurality of electronic devices such as the electronic devices 40A and 40B or the electronic devices 40B1 and 40B2 may separately receive electric power in a time-division manner.

However, in a case where a plurality of electronic devices receives electric power at different timings in a time sharing manner, a problem occurs with the time taken for all the electronic devices to completely receive the electric power, because other power receivers cannot receive electric power during the time each power receiver is receiving electric power.

Next, a power transmitting system and a power receiver according to the first embodiment will be described with reference to FIG. 4 and FIG. 9.

Figure 4:
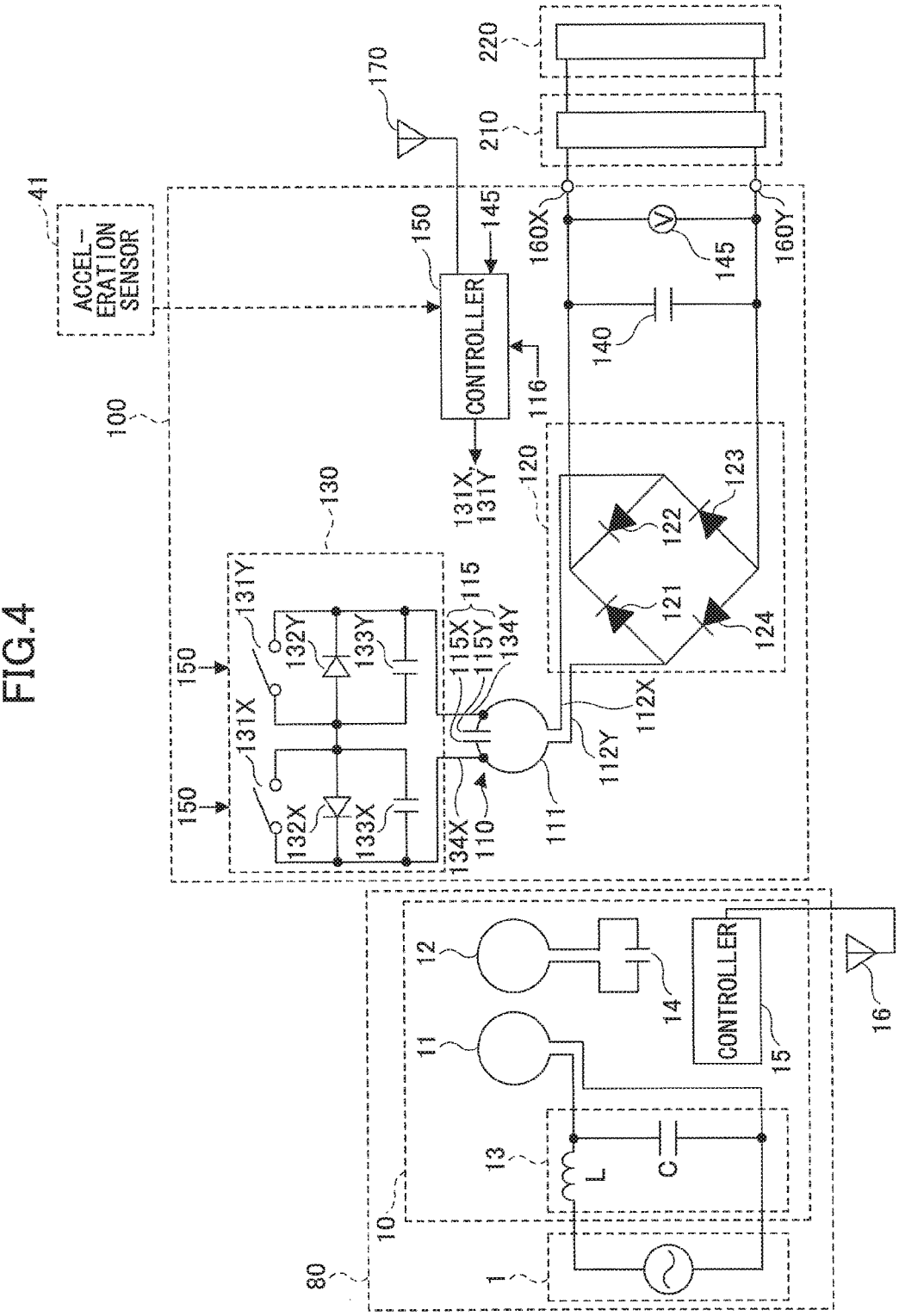
FIG. 4 is a diagram illustrating a power transmitting apparatus and a power receiver according to a first embodiment.

FIG. 4 is a diagram illustrating a power transmitting apparatus 80 and the power receiver 100 according to the first embodiment. The power transmitting apparatus 80 includes an alternating-current (AC) power source 1 and a power transmitter 10. Although the AC power source 1 and the power transmitter 10 are equivalent to those illustrated in FIG. 1, FIG. 4 illustrates a more specific configuration.

Further, for example, the power receiver 100 is included in an electronic device similar to the electronic device 40A or 40B illustrated in FIG. 2 or the electronic device 40B1 or 40B2 illustrated in FIG. 3. The electronic device includes an acceleration sensor 41.

The power transmitting apparatus 80 includes the AC power source 1 and the power transmitter 10.

The power transmitter 10 includes a primary-side coil 11, a primary-side resonant coil 12, a matching circuit 13, a capacitor 14, a controller 15, and an antenna 16.

The power receiver 100 includes a secondary-side resonant coil 110, a capacitor 115, a rectifier circuit 120, an adjuster 130, a smoothing capacitor 140, a controller 150, a voltmeter 145, output terminals 160X and 160Y, and an antenna 170. A DC-DC converter 210 is coupled to the output terminals 160X and 160Y, and a battery 220 is coupled to an output side of the DC-DC converter 210.

First, the power transmitter 10 will be described. As illustrated in FIG. 4, the primary-side coil 11 is a loop-shaped coil, and is coupled to the AC power source 1 via the matching circuit 13 between two ends of the primary-side coil 11. The primary-side coil 11 is disposed close to but not in contact with the primary-side resonant coil 12. The primary-side coil 11 is electromagnetically coupled to the primary-side resonant coil 12. The primary-side coil 11 is disposed such that the central axis of the primary-side coil 11 matches the central axis of the primary-side resonant coil 12. The central axis of the primary-side coil 11 and the central axis of the primary-side resonant coil 12 are made to match each other in order to inhibit leakage of magnetic flux and to inhibit unnecessary generation of magnetic fields around the primary-side coil 11 and the primary-side resonant coil 12, as well as improving the coupling strength between the primary-side coil 11 and the primary-side resonant coil 12.

The primary-side coil 11 generates magnetic fields by alternating-current (AC) power supplied from the AC power source 1 via the matching circuit 13, and transmits the electric power to the primary-side resonant coil 12 by electromagnetic induction (mutual induction).

As illustrated in FIG. 4, the primary-side resonant coil 12 is disposed close to but not in contact with the primary-side coil 11. The primary-side resonant coil 12 is electromagnetically coupled to the primary-side coil 11. Further, the primary-side resonant coil 12 has a predetermined resonance frequency and is designed to have a very high Q factor. The resonance frequency of the primary-side resonant coil 12 is set to be equal to the resonance frequency of the secondary-side resonant coil 110. The capacitor 14 for adjusting the resonance frequency is coupled in series between the two ends of the primary-side resonant coil 12.

The resonance frequency of the primary-side resonant coil 12 is set to be equal to the frequency of the AC power that the AC power source 1 outputs. The resonance frequency of the primary-side resonant coil 12 is determined depending on an electrostatic capacitance of the capacitor 14 and an inductance of the primary-side resonant coil 12. Hence, the electrostatic capacitance of the capacitor 14 and the inductance of the primary-side resonant coil 12 are set such that the resonance frequency of the primary-side resonant coil 12 is equal to the frequency of the AC power output from the AC power source 1.

The matching circuit 13 is inserted for matching impedance between the primary-side coil 11 and that of the AC power source 1, and includes an inductor L and a capacitor C.

The AC power source 1 is a power source that outputs AC power having a frequency necessary for the magnetic field resonance, and includes an amplifier that amplifies the output power. The AC power source 1 may, for example, output high frequency AC power from several hundreds of kHz to several tens of MHz.

The capacitor 14 is a variable capacitance capacitor inserted in series between the two ends of the primary-side resonant coil 12. The capacitor 14 is disposed for adjusting the resonance frequency of the primary-side resonant coil 12. The electrostatic capacitance of the capacitor 14 is set by the controller 15.

The controller 15 controls the output frequency and the output voltage of the AC power source 1 and controls the electrostatic capacitance of the capacitor 14. Also, the controller 15 executes data communication with the power receiver 100 through the antenna 16.

The power transmitting apparatus 80 as described above transmits, to the primary-side resonant coil 12 through magnetic induction, the AC power supplied from the AC power source 1 to the primary-side coil 11, and transmits the electric power from the primary-side resonant coil 12 to the secondary-side resonant coil 110 of the power receiver 100 through magnetic field resonance.

Next, the secondary-side resonant coil 110 included in the power receiver 100 will be described. Here, in the description of the embodiment, the resonance frequency is 6.78 MHz, for example.

The secondary-side resonant coil 110 has a resonance frequency equal to that of the primary-side resonant coil 12, and is designed to have a very high Q factor. The secondary-side resonant coil 110 includes a resonant coil part 111, and terminals 112X and 112Y. Here, although the resonant coil part 111 is substantially equivalent to the secondary-side resonant coil 110, a configuration, in which the terminals 112X and the 112Y are provided on both ends of the resonant coil part 111, is treated as the secondary-side resonant coil 110.

In the resonant coil part 111, the capacitor 115 for adjusting the resonance frequency is inserted in series. Further, the adjuster 130 is coupled in parallel with the capacitor 115. Further, the terminals 112X and 112Y are provided on both ends of the resonant coil part 111. The terminals 112X and 112Y are coupled to the rectifier circuit 120. The terminals 112X and 112Y are examples of a first terminal and a second terminal, respectively.

The secondary-side resonant coil 110 is coupled to the rectifier circuit 120 without introducing a secondary-side coil. In a state where resonance generation is enabled by the adjuster 130, the secondary-side resonant coil 110 outputs, to the rectifier circuit 120, the AC power transmitted from the primary-side resonant coil 12 of the power transmitter 10 through the magnetic field resonance.

The capacitor 115 is inserted in series with the resonant coil part 111 for adjusting the resonance frequency of the secondary-side resonant coil 110. The capacitor 115 includes terminals 115X and 115Y. Further, the adjuster 130 is coupled in parallel with the capacitor 115.

The rectifier circuit 120 includes four diodes 121 to 124. The diodes 121 to 124 are coupled in a bridge-like configuration, and rectify the full wave of the electric power input from the secondary-side resonant coil 110 to output the full-wave rectified power.

The adjuster 130 is coupled in parallel with the capacitor 115 in the resonant coil part 111 of the secondary-side resonant coil 110.

The adjuster 130 includes the switches 131X and 131Y, diodes 132X and 132Y, capacitors 133X and 133Y, and terminals 134X and 134Y.

The switches 131X and 131Y are coupled in series to each other between the terminals 134X and 134Y. The switches 131X and 131Y are examples of a first switch and a second switch, respectively. The terminals 134X and 134Y are coupled to the terminals 115X and 115Y of the capacitor 115, respectively. Therefore, the series circuit of the switches 131X and 131Y is coupled in parallel with the capacitor 115

The diode 132X and the capacitor 133X are coupled in parallel with the switch 131X. The diode 132Y and the capacitor 133Y are coupled in parallel with the switch 131Y. The diodes 132X and 132Y have their respective anodes coupled to each other, and have their respective cathodes coupled to the capacitor 115. That is, the diodes 132X and 132Y are coupled such that the respective rectification directions are opposite.

Note that the diodes 132X and 132Y are examples of a first rectifier and a second rectifier, respectively. Also, the adjuster 130 is not required to include the capacitors 133X and 133Y.

As the switch 131X, the diode 132X, and the capacitor 133X, FETs (Field Effect Transistors) may be used, for example. The body diode between the drain and source of a P-channel or N-channel FET may be coupled to have the rectification direction of the diode 132X as in the figure. When using an N-channel FET, the source corresponds to the anode of the diode 132X and the drain corresponds to the cathode of the diode 132X.

Also, the switch 131X is implemented by switching the connection state between the drain and the source by receiving the driving signal output from the controller 150 as input into the gate. Also, the capacitor 133X is implemented by the parasitic capacitance between the drain and the source.

Similarly, as the switch 131Y, the diode 132Y, and the capacitor 133Y, FETs may be used, for example. The body diode between the drain and source of a P-channel or N-channel FET may be coupled to have the rectification direction of the diode 132Y as in the figure. When using an N-channel FET, the source corresponds to the anode of the diode 132Y and the drain corresponds to the cathode of the diode 132Y.

Also, the switch 131Y is implemented by switching the connection state between the drain and the source by receiving the driving signal output from the controller 150 as input into the gate. Also, the capacitor 133Y is implemented by the parasitic capacitance between the drain and the source.

Note that the switch 131X, the diode 132X, and the capacitor 133X are not limited to those implemented by FETs, but may be implemented by having a switch, a diode, and a capacitor coupled in parallel. This is the same for the switch 131Y, the diode 132Y, and the capacitor 133Y.

The switches 131X and 131Y can be turned on/off in the phases opposite to each other. When the switch 131X is off and the switch 131Y is on, the power receiver 100 is in a state where a resonance current may flow in the adjuster 130 in a direction going from the terminal 134X to the terminal 134Y through the capacitor 133X and the switch 131Y, and the resonance current may flow in the capacitor 115 from the terminal 115X to the terminal 115Y. That is, the power receiver 100 in FIG. 4 transitions to a state where the resonance current may flow in the secondary-side resonant coil 110 in the clockwise direction.

Also, when the switch 131X is on and the switch 131Y is off, the current path generated in the adjuster 130 goes from the terminal 134X to the terminal 134Y through the switch 131X and the diode 132Y. Because this electric current path is parallel with the capacitor 115, the current stops flowing in the capacitor 115.

Therefore, when the power receiver 100 transitions from a state where the switch 131X is off, the switch 131Y is on, and hence, the resonance current flows in the secondary-side resonant coil 110 in the clockwise direction, to a state where the switch 131X is on and the switch 131Y is off, the resonance current stops occurring. This is because the capacitor no longer becomes included in the current path.

When the switch 131X is on and the switch 131Y is off, the power receiver 100 is in a state where a resonance current may flow in the adjuster 130 in a direction going from the terminal 134Y to the terminal 134X through the capacitor 133Y and the switch 131X, and the resonance current may flow in the capacitor 115 from the terminal 115Y to the terminal 115X. That is, the power receiver 100 in FIG. 4 transitions to a state where the resonance current may flow in the secondary-side resonant coil 110 in the counterclockwise direction.

Also, when the switch 131X is off and the switch 131Y is on, the current path generated in the adjuster 130 goes from the terminal 134Y to the terminal 134X through the switch 131Y and the diode 132X. Because this electric current path is parallel with the capacitor 115, the current stops flowing in the capacitor 115.

Therefore, when the power receiver 100 transitions from a state where the switch 131X is on, the switch 131Y is off, and hence, the resonance current flows in the secondary-side resonant coil 110 in the counterclockwise direction, to a state where the switch 131X is off and the switch 131Y is on, the resonance current stops occurring. This is because the capacitor no longer becomes included in the current path.

The adjuster 130 switches the switches 131X and 131Y as described above to switch between a state where the resonance current may be generated, and a state where the resonance current is not generated. The switches 131X and 131Y are switched by the driving signal output from the controller 150.

The frequency of the driving signal is set to the AC frequency received by the secondary-side resonant coil 110.

The switches 131X and 131Y cut off the AC current at a high frequency as described above. For example, the adjuster 130 having two FETs combined can cut off the AC current at high speed.

Note that the driving signal and operations of the adjuster 130 will be described later below with reference to FIG. 6.

The smoothing capacitor 140 is coupled to the output side of the rectifier circuit 120, and smooths the electric power, on which the full-wave rectification is performed by the rectifier circuit 120, and outputs the smoothed power as direct-current power. The output terminals 160X and 160Y are coupled to the output side of the smoothing capacitor 140. Because the negative component of AC power has been inverted into the positive component, the electric power on which the full-wave rectification has been performed by the rectifier circuit 120 can be treated as substantially AC power. However, stable DC power can be obtained by using the smoothing capacitor 140 even when ripple is included in the full wave rectified power.

Note that a line, which couples an upper side terminal of the smoothing capacitor 140 and the output terminal 160X, is a higher voltage side line, and a line, which couples a lower side terminal of the smoothing capacitor 140 and the output terminal 160Y, is a lower voltage side line.

The controller 150 stores, in an internal memory, data that represents the rated output of the battery 220. Further, in response to a request from the controller 15 of the power transmitter 10, the controller 150 measures electric power (received electric power), which the power receiver 100 receives from the power transmitter 10, and transmits the data, which represents the received electric power, to the power transmitter 10 via the antenna 170.

Further, upon receiving data that represents a phase from the power transmitter 10, the controller 150 uses the received phase to generate a driving signal to drive the switches 131X and 131Y. Note that the received electric power may be obtained by the controller 150 based on a voltage V measured by the voltmeter 145 and on an internal resistance value R of the battery 220. The received electric power P may be calculated by a formula of $P=V^2/R$. Further, a processor 151 obtains the received electric power P.

Figure 5:
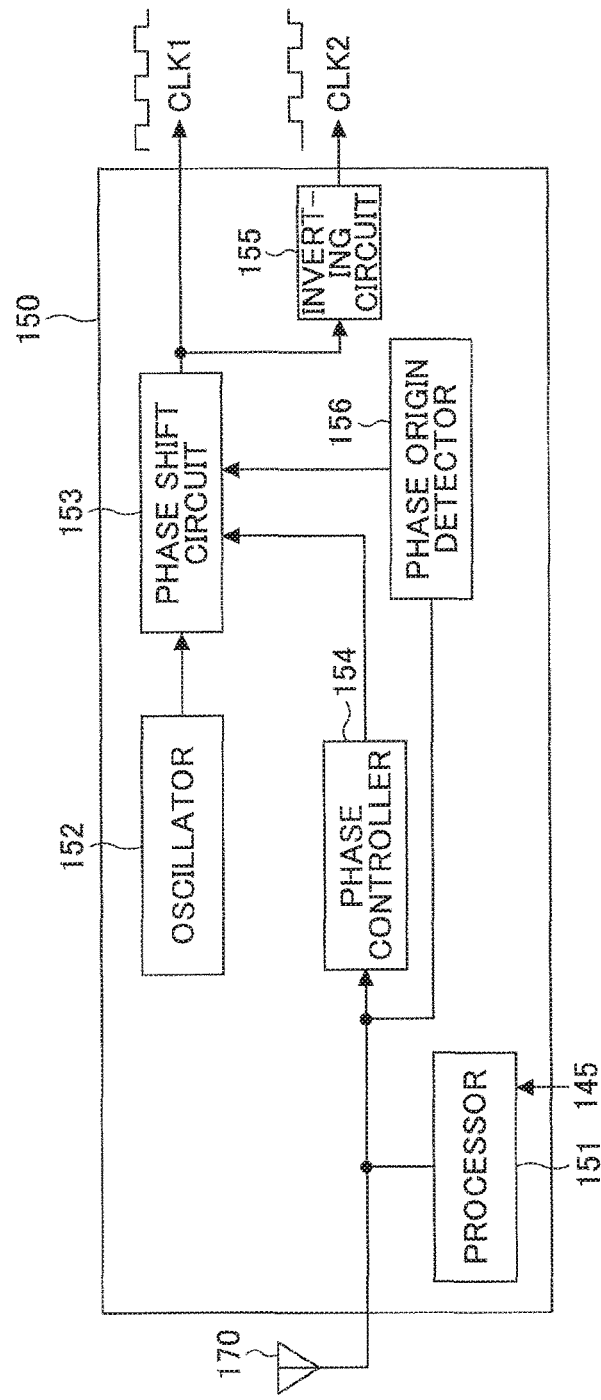
FIG. 5 is a diagram illustrating an internal configuration of a controller.

Here, the controller 150 will be described with reference to FIG. 5. FIG. 5 is a diagram illustrating an internal configuration of the controller 150.

The controller 150 includes the processor 151, an oscillator 152, a phase shift circuit 153, a phase controller 154, an inverting circuit 155, and a phase origin detector 156.

The processor 151 obtains received electric current P based on a voltage V measured by the voltmeter 145 and on an internal resistance value R of the battery 220. The processor 151 adjusts, based on the received electric power P, phases of clock signals CLK1 and CLK2 of the phase shift circuit 153.

Further, the processor 151 inputs the received electric power P to the phase origin detector 156, and causes the phase origin detector 156 to detect an origin of the phase.

The oscillator 152 may be any oscillator that can output a sinusoidal wave having a frequency equal to the frequency of the AC voltage output by the AC power source 1, and can adjust the oscillating frequency. Here, the frequency of the AC voltage is 6.78 MHz. The sinusoidal wave output from the oscillator 152 is used as the clock signals CLK1 and CLK2 to drive the switches 131X and 131Y.

For example, a crystal oscillator may be used as the oscillator 152. Further, instead of the crystal oscillator, a ceramic vibrating element such as a piezoelectric element may be used as the oscillator 152 to output a sinusoidal wave, for example.

Although a Phase Locked Loop (PLL) may be used instead of the oscillator 152, the power receiver 100 can be provided at lower cost by using the oscillator 152 than in a case of using the PLL.

The phase shift circuit 153 is coupled to the output side of the oscillator 152. The phase shift circuit 153 shifts, based on a signal representing a phase that is input from the phase controller 154, the phase of the clock signal, output from the oscillator 152, by the phase represented by the signal, and outputs the shifted clock signal. As the phase shift circuit 153, a phase shifter may be used, for example.

Upon receiving the signal representing the phase transmitted from the power transmitter 10 as input, the phase controller 154 converts the signal representing the phase into a signal for the phase shift circuit 153, and outputs the converted signal.

The clock signal, whose phase has been shifted by the phase based on the signal input from the phase controller 154, is branched off in two ways; one is output as it is as a clock signal CLK1, and the other is inverted by the inverting circuit 155, and output as a clock signal CLK2. The clock signals CLK1 and CLK2 are control signals output by the controller 150.

The inverting circuit 155 inverts the sinusoidal wave output from the phase shift circuit 153 to output it as the clock signal CLK2. The inverting circuit 155 may be any circuit that can invert a sinusoidal wave. For example, an operational amplifier or the like may be used as the inverting circuit 155.

The phase origin detector 156 controls the amount of shift by which the phase shift circuit 153 shifts the phase of the clock signal, so as to adjust the phase of the clock signal output by the phase shift circuit 153 with respect to the clock signal output by the oscillator 152, and to detect the phase at which the maximum efficiency of electric power reception is obtained. The phase obtained in such a way is used as the origin of the phase. Note that the phase origin detector 156 is controlled by the processor 151.

The voltmeter 145 is coupled between the output terminals 160X and 160Y. The voltmeter 160V is used to calculate the received electric power of the power receiver 100. Because in comparison with a case of measuring received electric power by measuring an electric current, losses are low by obtaining the received electric power based on the voltage V measured by the voltmeter 145 and on the internal resistance value R of the battery 220 as described above, thus it is a preferable measuring method. However, the received electric power of the power receiver 100 may also be calculated by measuring the electric current and the voltage. When measuring the electric current, a Hall Element, a magnetic resistance element, a detection coil, a resistor, or the like may be used for the measurement.

The DC-DC converter 210 is coupled to the output terminals 160X and 160Y, and converts the voltage of the direct-current power that is output from the power receiver 100 into the rated voltage of the battery 220 to output the converted voltage. The DC-DC converter 210 lowers the output voltage of the rectifier circuit 120 to the rated voltage of the battery 220 in a case where the output voltage of the rectifier circuit 120 is higher than the rated voltage of the battery 220. The DC-DC converter 210 raises the output voltage of the rectifier circuit 120 to the rated voltage of the battery 220 in a case where the output voltage of the rectifier circuit 120 is lower than the rated voltage of the battery 220.

The battery 220 may be any rechargeable secondary battery that can be repeatedly charged. For example, a lithium ion battery may be used as the battery 220. For example, in a case where the power receiver 100 is included in an electronic device such as a tablet computer or a smartphone, the battery 220 is a main battery of such an electronic device.

For example, the primary-side coil 11, the primary-side resonant coil 12, and the secondary-side resonant coil 110 may be made by winding copper wire. However, materials of the primary-side coil 11, the primary-side resonant coil 12, and the secondary-side resonant coil 110 may be metal other than copper (e.g., gold, aluminum, etc.). Further, materials of the primary-side coil 11, the primary-side resonant coil 12, and the secondary-side resonant coil 110 may be different from one another.

In such a configuration, the primary-side coil 11 and the primary-side resonant coil 12 correspond to a power transmitting side, and the secondary-side resonant coil 110 corresponds to a power receiving side.

According to a magnetic field resonance system, magnetic field resonance, generated between the primary-side resonant coil 12 and the secondary-side resonant coil 110, is utilized to transmit electric power from the power transmitting side to the power receiving side. Hence, it is possible to transmit the electric power over a longer distance than that of an electromagnetic induction system that utilizes electromagnetic induction to transmit electric power from the power transmitting side to the power receiving side.

The magnetic field resonance system is more flexible than the electromagnetic induction system with respect to the position gap or the distance between the resonant coils. The magnetic field resonance system thus has an advantage called "free-positioning".

Next, current paths generated when the switches 131X and 131Y are driven by a driving signal will be described with reference to FIG. 6.

FIG. 6 is a diagram illustrating current paths in the capacitor 115 and the adjuster 130. In FIG. 6, as in FIG. 4, an electric current direction will be referred to as the clockwise (CW) direction for an electric current flowing from the terminal 134X to the terminal 134Y through the capacitor 115 or the inside of the adjuster 130. Also, an electric current direction will be referred to as the counterclockwise (CCW) direction for an electric current flowing from the terminal 134Y to the terminal 134X through the capacitor 115 or the inside of the adjuster 130.

First, in a case where the switches 131X and 131Y are both off and an electric current flows clockwise (CW), a resonance current flows in the direction from the terminal 134X to the terminal 134Y through the capacitor 133X and the diode 132Y, and the resonance current flows in the capacitor 115 from the terminal 115X to the terminal 115Y. Therefore, the resonance current flows in the secondary-side resonant coil 110 in the clockwise direction.

In a case where the switches 131X and 131Y are both off and an electric current flows counterclockwise (CCW), a resonance current flows in the direction from the terminal 134Y to the terminal 134X through the capacitor 133Y and the diode 132X, and the resonance current flows in the capacitor 115 from the terminal 115Y to the terminal 115X. Therefore, the resonance current flows in the secondary-side resonant coil 110 in the counterclockwise direction.

In a case where the switch 131X is on, the switch 131Y is off, and an electric current flows clockwise (CW), the current path generated in the adjuster 130 goes from the terminal 134X to the terminal 134Y through the switch 131X and the diode 132Y. Because this electric current path is parallel with the capacitor 115, the current stops flowing in the capacitor 115. Therefore, the resonance current does not flow in the secondary-side resonant coil 110. Note that in this case, even if the switch 131Y is turned on, the resonance current does not flow in the secondary-side resonant coil 110.

In a case where the switch 131X is on, the switch 131Y is off, and an electric current flows counterclockwise (CCW), a resonance current flows in the adjuster 130 in the direction from the terminal 134Y to the terminal 134X through the capacitor 133Y and the switch 131X, and the resonance current flows in the capacitor 115 from the terminal 115Y to the terminal 115X. Therefore, the resonance current flows in the secondary-side resonant coil 110 in the counterclockwise direction. Note that electric current also flows in the diode 132X, which is parallel with the switch 131X.

In a case where the switch 131X is off, the switch 131Y is on, and an electric current flows clockwise (CW), a resonance current flows in the adjuster 130 in the direction from the terminal 134X to the terminal 134Y through the capacitor 133X and the switch 131Y, and the resonance current flows in the capacitor 115 from the terminal 115X to the terminal 115Y. Therefore, the resonance current flows in the secondary-side resonant coil 110 in the clockwise direction. Note that electric current also flows in the diode 132Y, which is parallel with the switch 131Y.

In a case where the switch 131X is off, the switch 131Y is on, and an electric current flows counterclockwise (CCW), the current path generated in the adjuster 130 goes from the terminal 134Y to the terminal 134X through the switch 131Y and the diode 132X. Because this electric current path is parallel with the capacitor 115, the current stops flowing in the capacitor 115. Therefore, the resonance current does not flow in the secondary-side resonant coil 110. Note that in this case, even if the switch 131X is turned on, the resonance current does not flow in the secondary-side resonant coil 110.

Note that the electrostatic capacitance that contributes to the resonance frequency of the resonance current is determined depending on the capacitor 115 and the capacitor 133X or 133Y. Therefore, it is desirable that the electrostatic capacitance of the capacitor 133X is equal to the electrostatic capacitance of the capacitor 133Y.

Figure 7A:
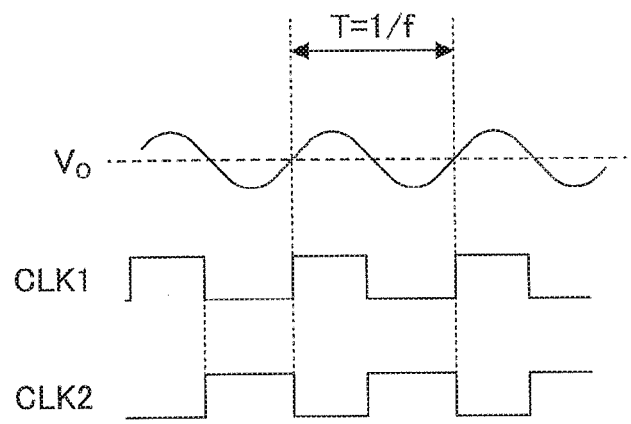
FIGS. 7A and 7B are diagrams illustrating an AC voltage generated in a secondary-side resonant coil and two clock signals included in a driving signal.
Figure 7B:
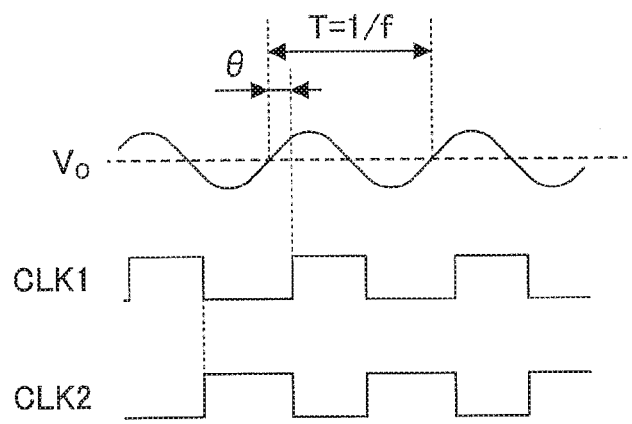

FIGS. 7A and 7B are diagrams illustrating an AC voltage generated in the secondary-side resonant coil 110 and two clock signals included in a driving signal.

An AC voltage $V_0$ illustrated in FIG. 7A and FIG. 7B is represented by a waveform having the same frequency as the power transmission frequency, and is an AC voltage generated, for example, in the secondary-side resonant coil 110. Also, the clock signals CLK1 and CLK2 are two clock signals included in a driving signal. For example, the clock signal CLK1 is used to drive the switch 131X, and the clock signal CLK2 is used to drive the switch 131Y. The clock signals CLK1 and CLK2 are examples of a first signal and a second signal, respectively and used to switch the switches 131X and 131Y.

In FIG. 7A, the clock signals CLK1 and CLK2 are synchronized with the AC voltage $V_0$. That is, the frequency of the clock signals CLK1 and CLK2 is equal to the frequency of the AC voltage $V_0$, and the phase of the clock signal CLK1 is equal to the phase of the AC voltage $V_0$. Note that the clock signal CLK2 has a phase different from that of the clock signal CLK1 by 180 degrees, namely, the opposite phase.

In FIG. 7A, the period T of the AC voltage $V_0$ is the reciprocal of the frequency f, and the frequency f is 6.78 MHz.

The power receiver 100 according to the first embodiment controls the phases of the clock signals CLK1 and CLK2, with reference to phases of the clock signals CLK1 and CLK2 at which the received electric power becomes the maximum without synchronizing the AC voltage $V_O$ and the clock signals CLK1 and CLK2. Here, the phases that are references are referred to as the origins of the phases. The origins of the phases will be described later below.

In FIG. 7B, the phases of the clock signals CLK1 and CLK2 are behind the AC voltage $V_O$ by θ degrees. Such clock signals CLK1 and CLK2 having the phases of θ degrees with respect to the AC voltage $V_O$ may be generated by the controller 150 using the phase shift circuit 153.

Next, with reference to FIG. 8, the efficiency of electric power reception will be described when the power receiver 100 receives the electric power from the power transmitter 10 in a case where the phase of the driving signal is adjusted.

Figure 8:
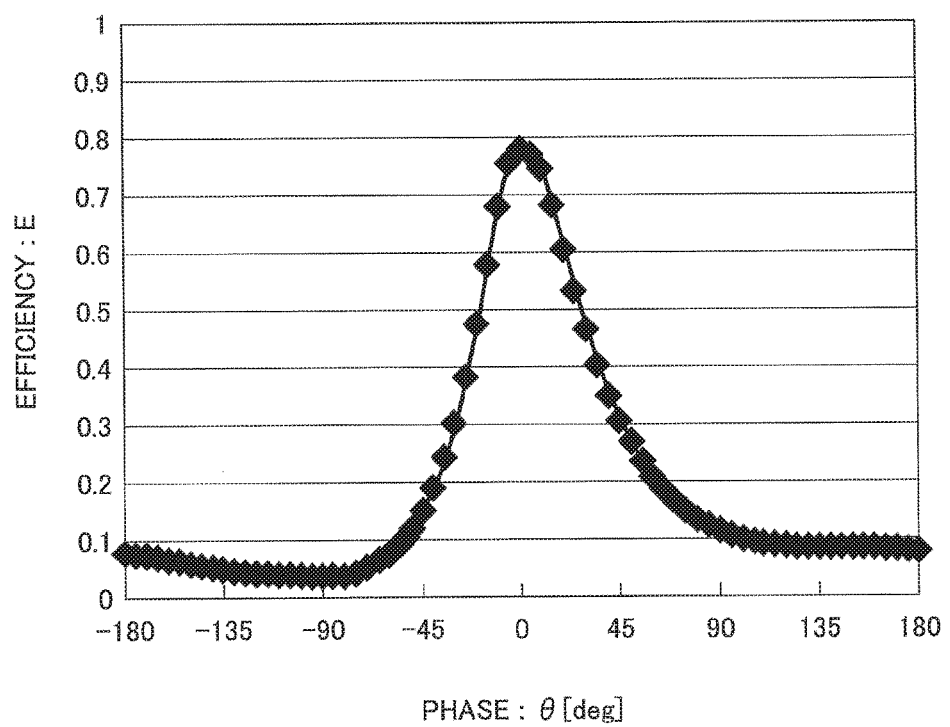
FIG. 8 is a diagram illustrating a simulation result that represents a property of efficiency of electric power reception with respect to a phase of a driving signal.

FIG. 8 is a diagram illustrating a simulation result representing a property of efficiency of electric power reception with respect to a phase of a driving signal. The phase on the horizontal axis represents the phase of the two clock signals with respect to the AC voltage $V_O$ where 0 degrees is set as the phase that makes the received electric power maximum. The efficiency of electric power reception on the vertical axis represents the ratio of electric power output by the power receiver 100 ($P_{out}$) to electric power input into the power transmitter 10 by the AC power supply 1 ($P_{in}$) (see FIG. 1). The efficiency of electric power reception is equal to the efficiency of electric power transmission between the power transmitter 10 and the power receiver 100.

Note that the frequency of the electric power transmitted by the power transmitter 10 is 6.78 MHz, and the frequency of the driving signal is set to be the same. Also, the state where the phase is 0 degrees is a state where the resonance through magnetic resonance is generated in the secondary-side resonant coil 110 over the entire period of one cycle of the resonance current, and the resonance current is flowing in the secondary-side resonant coil 110. An increase of the phase means an increase of a period during which resonance does not occur in the secondary-side resonant coil 110 over one cycle of the resonance current. Accordingly, the state in which the phase is 180 degrees is a state where the resonance current does not flow in the secondary-side resonant coil 110 at all theoretically.

As illustrated in FIG. 8, upon an increase of the phase from 0 degrees, the efficiency of electric power reception decreases. Increasing the phase from 0 degrees is delaying the phase of the clock signals CLK1 and CLK2 with respect to the AC voltage $V_O$. When the phase is approximately 60 degrees or more, the efficiency of electric power reception is approximately 0.1 or less. In this way, upon changing the phases of the two clock signals with respect to the AC voltage $V_O$, the amount of electric power of the resonance current flowing in the 110 changes. Thereby, the efficiency of electric power reception changes.

Figure 9:
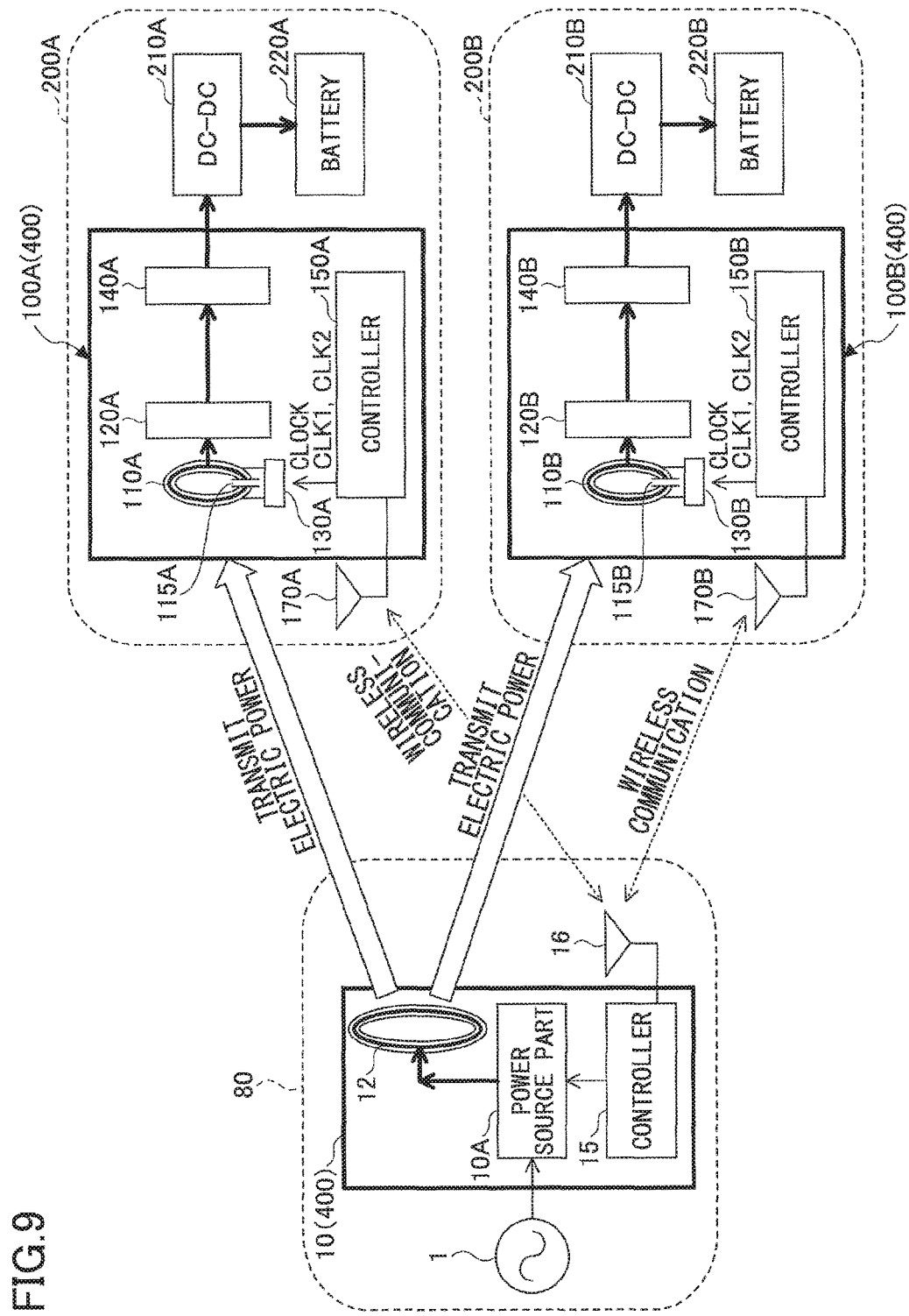
FIG. 9 is a diagram illustrating electronic devices and a power transmitting apparatus using a power transmitting system according to the first embodiment.

FIG. 9 is a diagram illustrating electronic devices 200A and 200B and the power transmitting apparatus 80 using a power transmitting system 400 according to the first embodiment.

Although the power transmitting apparatus 80 in FIG. 9 is the same as the power transmitting apparatus 80 illustrated in FIG. 4, configuration elements other than the primary-side coil 11, the controller 15, and the antenna 16 in FIG. 4 are expressed as a power source part 10A in FIG. 9. The power source part 10A expresses the primary-side resonant coil 12, the matching circuit 13, and the capacitor 14 collectively. Note that the AC power source 1, the primary-side resonant coil 12, the matching circuit 13, and the capacitor 14 may be treated as the power source part collectively.

For example, the antenna 16 may be any antenna that can perform wireless communication in a short distance such as Bluetooth (registered trade mark). The antenna 16 is provided in order to receive, from the power receivers 100A and 100B included in the electronic devices 200A and 200B, data representing the received electric power and the rated output. The received data is input to the controller 15. The controller 15 is an example of a controller and, is an example of a third communication part.

Each of the electronic devices 200A and 200B may be a terminal device such as a tablet computer or a smartphone, for example. The electronic devices 200A and 200B respectively include the power receivers 100A and 100B, DC-DC converters 210A and 210B, and batteries 220A and 220B.

Each of the power receivers 100A and 100B have a configuration equivalent to that of the power receiver 100 illustrated in FIG. 4. In the following, the power receivers 100A and 100B are referred to as the power receivers 100 unless otherwise distinguished.

Each of the DC-DC converters 210A and 210B is equivalent to the DC-DC converter 210 illustrated in FIG. 4. Further, each of the batteries 220A and 220B is equivalent to the battery 220 illustrated in FIG. 4.

The power receiver 100A includes a secondary-side resonant coil 110A, a capacitor 115A, a rectifier circuit 120A, an adjuster 130A, a smoothing capacitor 140A, a controller 150A, and an antenna 170A. The secondary-side resonant coil 110A is an example of a first secondary-side resonant coil.

The secondary-side resonant coil 110A, the capacitor 115A, the rectifier circuit 120A, the adjuster 130A, the smoothing capacitor 140A, and the controller 150A respectively correspond to the secondary-side resonant coil 110, the capacitor 115, the rectifier circuit 120, the adjuster 130, the smoothing capacitor 140, and the controller 150 illustrated in FIG. 4. Note that, in FIG. 9, the secondary-side resonant coil 110A, the rectifier circuit 120A, and the smoothing capacitor 140A are illustrated in a simplified manner, and the voltmeter 145 and the output terminals 160X and 160Y are omitted.

The power receiver 100B includes a secondary-side resonant coil 110B, a capacitor 115B, a rectifier circuit 120B, an adjuster 130B, a smoothing capacitor 140B, a controller 150B, and an antenna 170B. The power receiver 100B is an example of another power receiver as seen from the power receiver 100A. The secondary-side resonant coil 110B is an example of a second secondary-side resonant coil.

The secondary-side resonant coil 110B, the capacitor 115B, the rectifier circuit 120B, the adjuster 130B, the smoothing capacitor 140B, and the controller 150B respectively correspond to the secondary-side resonant coil 110, the capacitor 115, the rectifier circuit 120, the adjuster 130, the smoothing capacitor 140, and the controller 150 illustrated in FIG. 4. Note that, in FIG. 9, the secondary-side resonant coil 110B, the rectifier circuit 120B, and the smoothing capacitor 140B are illustrated in a simplified manner, and the voltmeter 145 and the output terminals 160X and 160Y are omitted.

For example, the antennas 170A and 170B may be any antenna that can perform wireless communication in a short distance such as Bluetooth (registered trade mark). The antennas 170A and 170B are provided in order to perform data communication with the antenna 16 of the power transmitter 10. The antennas 170A and 170B are coupled to the controllers 150A and 150B of the power receivers 100A and 100B, respectively. The controllers 150A and 150B are examples of a drive controller. The controllers 150A and 150B are examples of a first communication part and a second communication part, respectively.

The controller 150A of the power receiver 100A transmits, to the power transmitter 10 via the antenna 170A, data representing received electric power of the secondary-side resonant coil 110A and a rated output of the battery 220A. Similarly, the controller 150B of the power receiver 100B transmits, to the power transmitter 10 via the antenna 170B, data representing received electric power of the secondary-side resonant coil 110B and a rated output of the battery 220B.

In a state where the electronic devices 200A and 200B are arranged close to the power transmitting apparatus 80, the electronic devices 200A and 200B can respectively charge the batteries 220A and 220B without contacting the power transmitting apparatus 80. The batteries 220A and 220B can be charged at the same time.

The power transmitting system 400 is structured with the power transmitter 10 and the power receivers 100A and 100B of the configuration elements illustrated in FIG. 9. That is, the power transmitting apparatus 80 and the electronic devices 200A and 200B adopt the power transmitting system 400 that enables electric power transmission in a non-contact state through magnetic field resonance.

Here, when the batteries 220A and 220B are charged at the same time, a state may occur in which the balance of electric power supplied to the electronic devices 200A and 200B is not good as described with reference to FIG. 2 and FIG. 3.

Hence, in order to improve the balance of supplied electric power, the power transmitter 10 sets, based on the efficiency of electric power reception of the secondary-side resonant coil 110A, on the rated output of the battery 220A, on the efficiency of electric power reception of the secondary-side resonant coil 110B, and on the rated output of the battery 220B, phases of the driving signals (the clock signals CLK1 and CLK2), which drive the adjusters 130A and 130B, with respect to the AC voltage $V_0$.

Figure 10:
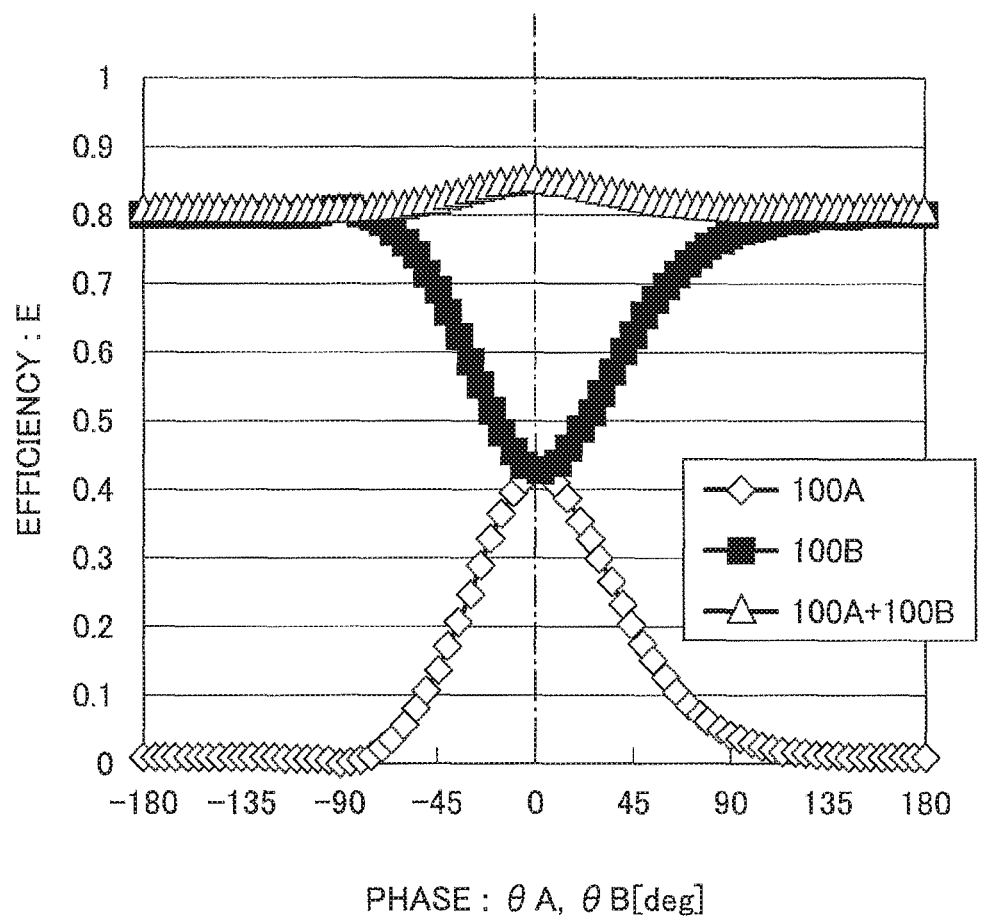
FIG. 10 is a diagram illustrating a relationship between phases of driving signals and efficiencies of electric power reception of the power receivers.

FIG. 10 is a diagram illustrating a relationship between the phases of the driving signals and the efficiencies of electric power reception of the power receivers 100A and 100B.

A case will be described here where the phase of the driving signal for driving the adjuster 130A of the power receiver 100A is changed from the phase (0 degrees) at which the efficiency of electric power reception reaches the maximum, in a state where the phase of the driving signal for driving the adjuster 130B of the power receiver 100B is fixed to the phase (0 degrees) at which the efficiency of electric power reception reaches the maximum.

Note the efficiency of electric power reception becoming the maximum is the received electric power becoming the maximum. Hence, the phase at which the efficiency of the electric power reception becomes the maximum is the phase at which the received electric power becomes the maximum, and means the origin of the phase.

Figure 11:
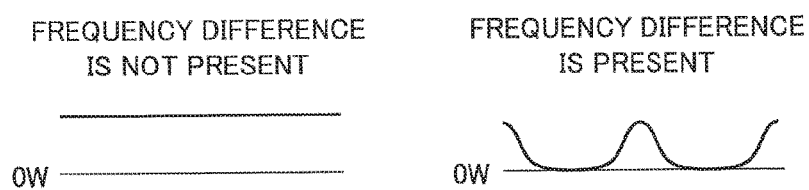
FIG. 11 is a diagram illustrating beats of electric power received by the power receiver (received electric power)

In FIG. 11, the horizontal axis represents the phases (θA, θB) of the driving signals for driving the adjusters 130A and 130B of the power receivers 100A and 100B. Also, the vertical axis on the left represents the respective efficiencies of electric power reception of the power receivers 100A and 100B, and the total value of the efficiencies of electric power reception of the power receivers 100A and 100B.

In a state where the phase of the driving signal for driving the adjuster 130B of the power receiver 100B is fixed to 0 degrees, when the phase of the driving signal for driving the adjuster 130A of the power receiver 100A is increased or decreased from 0 degrees, as illustrated in FIG. 10, the ratio of the efficiency of electric power reception of the power receiver 100A decreases. The efficiency of electric power reception of the power receiver 100A is the maximum when the phase is 0 degrees. Also, the ratio of the efficiency of electric power reception of the power receiver 100B increases in response to a decrease of the efficiency of electric power reception of the power receiver 100A.

In this way, when the phase of the driving signal for driving the adjuster 130A of the power receiver 100A is changed, the amount of electric power received by the power receiver 100A decreases, and therefore the electric current flowing in the power receiver 100A also decreases. That is, changing the phase changes the impedance of the power receiver 100A.

In simultaneous electric power transmission using magnetic field resonance, electric power, transmitted from the power transmitter 10 to the power receivers 100A and 100B through the magnetic field resonance, is distributed to the power receivers 100A and 100B. Therefore, when the phase of the driving signal for driving the adjuster 130A of the power receiver 100A is changed from 0 degrees, the amount of electric power to be received by the power receiver 100B increases by the decreased amount of the electric power to be received by the power receiver 100A.

Hence, as illustrated in FIG. 10, the ratio of the efficiency of electric power reception of the power receiver 100A decreases. Further, in response to the decrease of the ratio of the efficiency of electric power reception of the power receiver 100A, the ratio of the efficiency of electric power reception of the power receiver 100B increases.

When the phase of the driving signal for driving the adjuster 130A of the power receiver 100A changes from 0 degrees to ±90 degrees, the efficiency of electric power reception of the power receiver 100A decreases to nearly 0, and the efficiency of electric power reception of the power receiver 100B increases to approximately 0.8.

Then, the sum of the efficiencies of electric power reception of the power receivers 100A and 100B is approximately 0.85 when the phase of the driving signal for driving the adjuster 130A of the power receiver 100A is 0 degrees. When the phase of the driving signal for driving the adjuster 130A of the power receiver 100A changes to approximately ±90 degrees, the sum of the efficiencies of electric power reception of the power receivers 100A and 100B becomes approximately 0.8.

In this way, while the phase of the driving signal for driving the adjuster 130B of the power receiver 100B is fixed to 0 degrees, when the phase of the driving signal for driving the adjuster 130A of the power receiver 100A is changed from 0 degrees, the ratio of the efficiency of electric power reception of the power receiver 100A decreases, and the ratio of the efficiency of electric power reception of the power receiver 100B increases. Then, the sum of the efficiencies of electric power reception of the power receivers 100A and 100B does not change largely from a value around 0.8.

In simultaneous electric power transmission using magnetic field resonance, electric power, transmitted from the power transmitter 10 to the power receivers 100A and 100B through the magnetic field resonance, is distributed to the power receivers 100A and 100B. Therefore, even if the phase changes, the sum of the efficiencies of electric power reception of the power receivers 100A and 100B does not largely change.

Similarly, while the phase of the driving signal for driving the adjuster 130A of the power receiver 100A is fixed to 0 degrees, when the phase of the driving signal for driving the adjuster 130B of the power receiver 100B is decreased from 0 degrees, the ratio of the efficiency of electric power reception of the power receiver 100B decreases, and the ratio of the efficiency of electric power reception of the power receiver 100A increases. Then, the sum of the efficiencies of electric power reception of the power receivers 100A and 100B does not largely change from a value around 0.8.

Therefore, by adjusting either the phase of the driving signal for driving the adjuster 130A of the power receiver 100A or the phase of the driving signal for driving the adjuster 130B of the power receiver 100B, the ratios of the efficiencies of electric power reception of the power receivers 100A and 100B can be adjusted.

As described above, upon changing the phase of the driving signal for driving the adjuster 130A or the adjuster 130B, the ratios of the efficiencies of electric power reception of the secondary-side resonant coils 110A and 110B of the power receivers 100A and 100B are changed.

Hence, according to the first embodiment, one of the phase of the driving signal for the adjuster 130A of the power receiver 100A and the phase of the driving signal for the adjuster 130B of the power receiver 100B is changed from a reference phase. For example, a phase at which the efficiency of electric power reception is the maximum is defined as the reference phase (0 degrees), in which case, the other phase is changed from 0 degrees. Hence, according to the first embodiment, it may be determined as follows as to which one of the phases of the driving signals of the adjusters 130A and 130B is to be changed from the origin of the phase.

First, a first value, obtained by dividing the rated output of the battery 220A by the efficiency of electric power reception of the secondary-side resonant coil 110A and a second value, obtained by dividing the rated output of the battery 220B by the efficiency of electric power reception of the secondary-side resonant coil 110B, are calculated.

Then, the phase of the driving signal corresponding to the power receiver (100A or 100B), having the smaller value among the first value and the second value, is changed from 0 degrees to an appropriate phase.

The value, obtained by dividing the rated output by the efficiency of electric power reception, represents an amount of electric power (required amount of electric power transmission) to be transmitted from the power transmitter 10 to the power receiver 100A or 100B. The required amount of electric power transmission is an amount of electric power to be transmitted from the power transmitter 10 so that the power receiver (100A or 100B) receives the electric power without generating excessive electric power and insufficient electric power.

Accordingly, by reducing an amount of electric power supplied to the power receiver (100A or 100B) of which the required amount of electric power transmission is smaller, it is possible to increase an amount of electric power supplied to the power receiver (100A or 100B) of which the required amount of electric power transmission is larger. As a result, it is possible to improve the balance between the amount of electric power supplied to the power receiver 100A and the amount of electric power supplied to the power receiver 100B.

As can be seen from FIG. 10, when the phase of one power receiver (100A or 100B) is decreased, the amount of received electric power of the one power receiver (100A or 100B) decreases. Further, the amount of received electric power of the other power receiver (100A or 100B) increases in a state in which the phase of the other power receiver (100A or 100B) is fixed to 0 degrees.

Hence, by changing, from the origin of the phase (0 degrees), the phase of the driving signal corresponding to the power receiver (100A or 100B) of which the required amount of electric power transmission is smaller, it is possible to reduce the amount of electric power supplied to the power receiver (100A or 100B) of which the required amount of electric power transmission is smaller and to increase the amount of electric power supplied to the power receiver (100A or 100B) of which the required amount of electric power transmission is larger.

In this way, the balance of the amounts of electric power supplied to the power receivers 100A and 100B may be improved. Note that a method for setting a specific phase will be described later below.

FIG. 11 and FIGS. 12A to 12E are diagrams illustrating beats of electric power received by the power receiver 100 (received electric power). In FIG. 11 and FIGS. 12A to 12E, the horizontal axis represents a time axis and the vertical axis represents received electric power. In FIG. 11 and FIGS. 12A to 12E, 0 W represents the level at which the received electric power is zero.

The electric power received by the power receiver 100 (received electric power) includes a beat. When there is no difference between the frequency of the AC voltage $V_0$ generated in the secondary-side resonant coil 110 and the frequencies of the clock signals CLK1 and CLK2 (when there is no frequency difference), a beat does not occur as illustrated in the left side of FIG. 11.

However, in a case where there is a frequency difference, a beat occurs as illustrated in the right side of FIG. 11. When beats occur, the received electric power periodically changes and periods during which the received electric power is substantially zero occurs.

Figure 12A:
FIGS. 12A to 12E are diagrams illustrating beats of electric power received by the power receiver (received electric power)
Figure 12B:
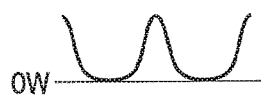
Figure 12C:
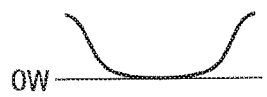
Figure 12D:
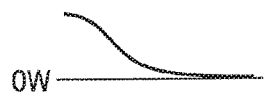

As illustrated in FIG. 12A, for a high frequency difference, the frequency of the beat is high. Further, as illustrated in FIGS. 12B, 12C, and 12D, as the frequency difference decreases, the frequency of the beat decreases.

Figure 12E:
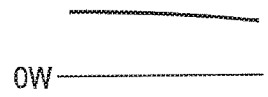

As illustrated in FIG. 12E, because the beat occurs even when the frequency difference is significantly small, the received electric power is not constant with respect to a change of time and decreases with the passage of time.

Here, a case will be described as an example in which the frequency of the AC voltage $V_0$ is 6.78 MHz and the frequency difference between the frequency of the AC voltage $V_0$ and the frequency of the clock signals CLK1 and CLK2 is 1 mHz. In this case, a period of a beat is approximately 30 minutes. Hence, for example, even in a case where the frequency difference between the frequency of the AC voltage $V_0$ and the frequency of the clock signals CLK1 and CLK2 is 1 mHz, the received electric power becomes substantially zero about 15 minutes later.

In a case where the frequency of the AC voltage $V_0$ is 6.78 MHz, it is very difficult to make the frequency difference zero, and it is not easy to make the frequency difference 1 mHz.

According to the first embodiment, received electric power is secured in such a case where a beat of the received electric power occurs.

Figure 14:
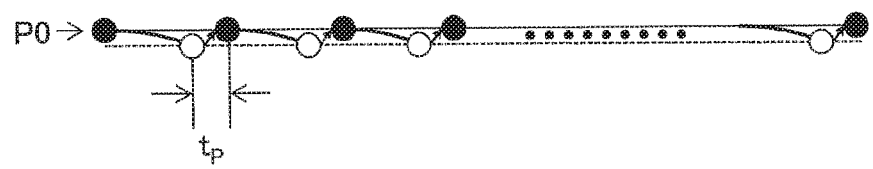
FIG. 14 is a diagram illustrating the method of reducing the effects of the beats in the power receiver according to the first embodiment.

FIG. 13 and FIG. 14 are diagrams illustrating a method of reducing effects of beats in the power receiver 100 according to the first embodiment. In FIG. 13 and FIG. 14, the horizontal axis represents time and the vertical axis represents received electric power of the power receiver 100.

As illustrated in FIG. 13, when a beat occurs, the received electric power gradually decreases in accordance with the passage of time from t=0. In such a case, when the received electric power decreases by X % with respect to the received electric power P0 at t=0, the phases of the clock signals CLK1 and CLK2 are adjusted to increase the received electric power. In FIG. 13, the phases of the clock signals CLK1 and CLK2 are adjusted to increase the received electric power at time t1.

In this case, it is desirable that an elapsed time $t_X$ until the received electric power decreases by X % is sufficiently longer than a transient response period $t_P$ from adjusting the phases of the clock signals CLK1 and CLK2 until the electric power becomes stable. Hence, according to the power receiver 100 of the first embodiment, the frequencies of the clock signals CLK1 and CLK2 are adjusted such that the elapsed time $t_X$ is sufficiently longer than the transient response period $t_P$.

The frequencies of the clock signals CLK1 and CLK2 are adjusted by the oscillator 152 (see FIG. 5) based on the received electric power calculated by the processor 151 based on the detected voltage of the voltmeter 145. Note that the received electric power P0 is an example of a preset value that is a target value for when the phases of the clock signals CLK1 and CLK2 are adjusted to increase the received electric power. In a case where a plurality of power receivers 100 receive electric power from the power transmitter 10, the electric power P0 is set by the power transmitter 10 in order to optimize the electric power allocation to the plurality of power receivers 100.

Further, in a case where beats occur, the received electric power again decreases even when phases of the clock signals CLK1 and CLK2 are adjusted to increase the received electric power. Therefore, as illustrated in FIG. 14, decrease amounts of the received electric power can be made within 1% by repeatedly adjusting the phases of the clock signals CLK1 and CLK2. In FIG. 14, the received electric power increased by adjusting the phases of the clock signals CLK1 and CLK2 is illustrated by the black circles (●), and the electric power before being increased is illustrated by the white circles (○).

The phases of the clock signals CLK1 and CLK2 are adjusted by the phase shift circuit 153 (see FIG. 5) based on the received electric power calculated by the processor 151. The increased received electric power (●) is the electric power P0 illustrated in FIG. 13.

When the phases are adjusted for increasing the received electric power as illustrated in FIG. 14, the degree of bringing forward or delaying the phases may be set after investigating in advance a relationship between a change of the received electric power and the phases through an experiment or the like, for example.

Here, although the phases of the clock signals CLK1 and CLK2 are adjusted for every time the received electric power decreases by 1% in the embodiment described as an example, the value of X % may be set as appropriate in accordance with a target.

Figure 15:
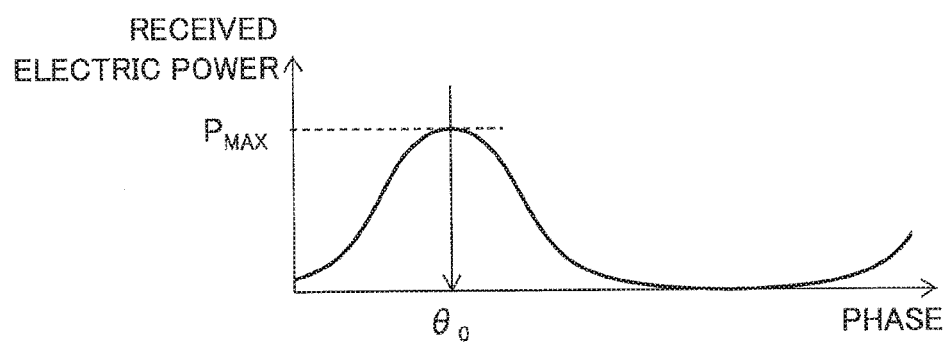
FIG. 15 is a diagram illustrating a method for finding an origin of the phase.

FIG. 15 is a diagram illustrating a method for finding the origin of the phase.

According to the power receiver 100 of the first embodiment, the phases of the clock signals CLK1 and CLK2 are scanned 360 degrees to calculate the phase $\theta_0$ that gives the maximum value $P_{MAX}$ of the received electric power. The phase $\theta_0$ is used as origin of phase. The phases of the clock signals CLK1 and CLK2 may be scanned by the processor 151 of the controller 150 causing the phase origin detector 156 to control the phase shift circuit 153 such that the phase shift circuit 153 shifts the phases of the clock signals CLK1 and CLK2.

Next, a method, by which the power transmitter 10 obtains data that represents an efficiency of electric power reception and a rated output from each of the power receivers 100A and 100B, will be described with reference to FIG. 16.

Figure 16:
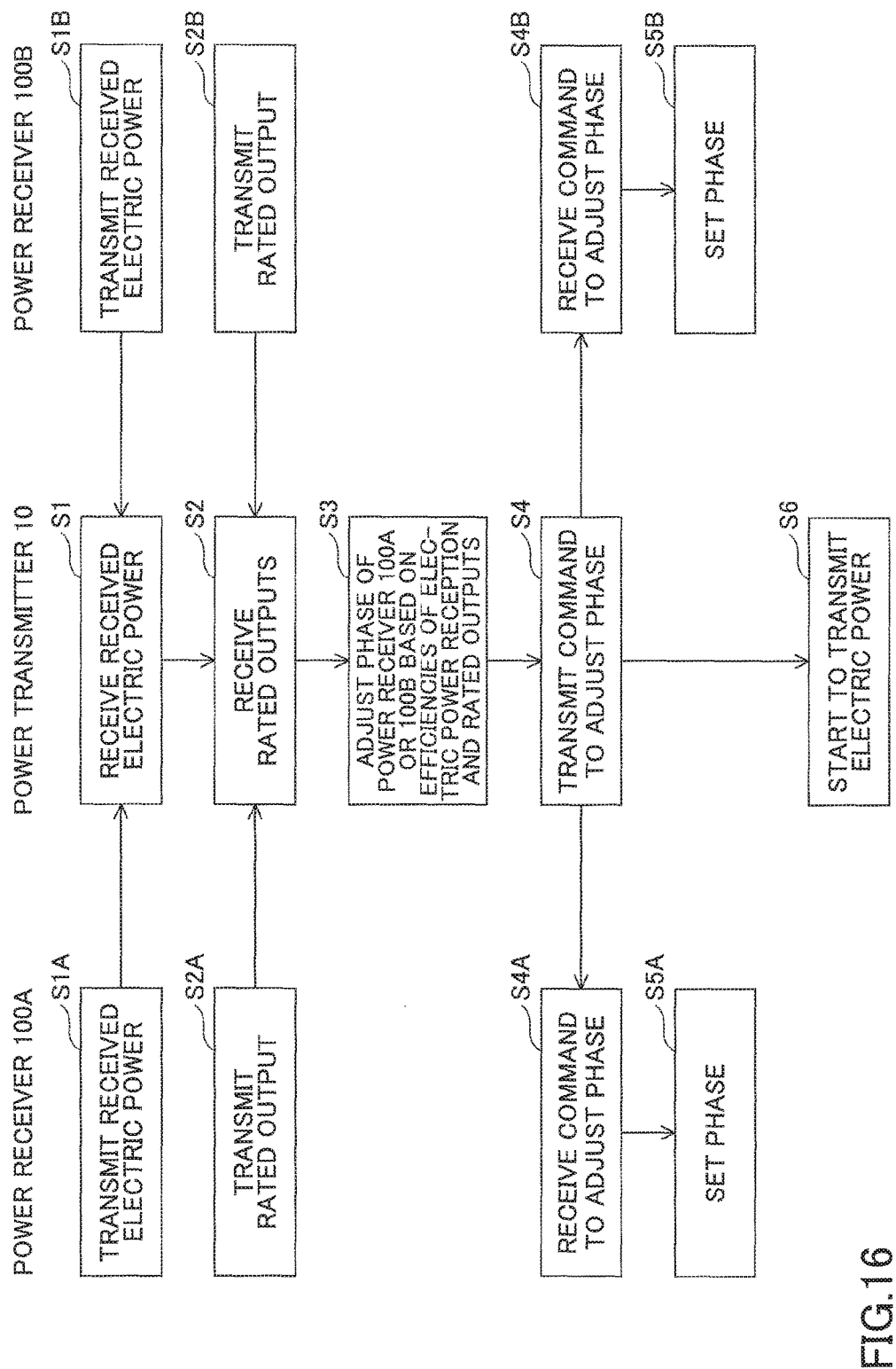
FIG. 16 is a task diagram illustrating a process that is executed by the power transmitter and the power receivers for setting the phases.

FIG. 16 is a task diagram illustrating a process that the power transmitter 10 and the power receivers 100A and 100B execute for setting the phases. This task is executed by the controllers 15, 150A and 150B (see FIG. 9).

First, the power receiver 100A transmits data, which represents received electric power, to the power transmitter 10 in step S1A. Similarly, the power receiver 100B transmits data, which represents received electric power, to the power transmitter 10 in step S1B. In this way, the power transmitter 10 receives in step S1 the data representing the received electric power from each of the power receivers 100A and 100B.

For example, in response to a request from the power transmitter 10, the controllers 150A and 150B may transmit the data, which represents the received electric power, via the antennas 170A and 170B. Further, the data representing the received electric power may include an identifier for identifying the power receivers 100A and 100B.

The data representing the received electric power may be obtained as follows. First, the power transmitter 10 wirelessly transmits a signal to the power receiver 100B to turn on both of the switches (131X and 131Y of FIG. 4) of the adjuster 130B, and the power transmitter 10 wirelessly transmits a signal to the power receiver 100A to turn off both of the switches of the adjuster 130A.

Here, upon turning on both of the switches of the adjuster 130B, the resonance stops occurring in the adjuster 130B, and the power receiver 100B transitions to a state of not receiving the electric power. That is, the power receiver 100B is turned off. Also, upon turning off both of the switches of the adjuster 130A, it transitions to a state where the resonance current flows in the secondary-side resonant coil 110A.

Then, predetermined electric power is transmitted from the power transmitter 10 to the power receiver 100A through magnetic field resonance, and the power receiver 100A receives the electric power. At this time, by transmitting a signal, which represents the amount of electric power received by the power receiver 100A, to the power transmitter 10, the efficiency of electric power reception of the power receiver 100A can be measured by the power transmitter 10.

Also, to measure the efficiency of electric power reception of the power receiver 100B, the power transmitter 10 wirelessly transmits a signal to the power receiver 100A to turn on both of the switches of the adjuster 130A, and the power transmitter 10 wirelessly transmits a signal to the power receiver 100B to turn off both of the switches of the adjuster 130B. Then, the power transmitter 10 transmits predetermined electric power to the power receiver 100B through magnetic resonance, the power receiver 100B transmits a signal representing the amount of the received electric power to the power transmitter 10, and consequently, the power transmitter 10 can measure the efficiency of electric power reception of the power receiver 100B.

Next, the power receiver 100A transmits data, which represents the rated output, to the power transmitter 10 in step S2A. Similarly, the power receiver 100B transmits data, which represents the rated output, to the power transmitter 10 in step S2B. In this way, the power transmitter 10 receives the data representing the rated output from each of the power receivers 100A and 100B in step S2.

For example, the data representing the rated output of the electronic device 200A may be previously stored in an internal memory of the controller 150A and the data representing the rated output of the electronic device 200B may be previously stored in an internal memory of the controller 150B. Then, the controllers 150A and 150B may transmit, to the power transmitter 10, the stored data via the antennas 170A and 170B after transmitting the data representing the efficiency of electric power reception.

Next, the power transmitter 10 adjusts, based on the data representing the efficiency of electric power reception of the power receiver 100A, on the data representing the rated output, on the data representing the efficiency of electric power reception of the power receiver 100B, and on the data representing the rated output, one of the phases of the driving signals of the power receivers 100A and 100B in step S3. The other of the phases of the driving signals is not adjusted.

Next, the power transmitter 10 transmits, to the respective power receivers 100A and 100B in step S4, commands to adjust the phases. Then, the power receiver 100A receives the command to adjust the phase in step S4A and the power receiver 100B receives the command to adjust the phase in step S4B.

The command to adjust the phase includes two kinds of commands that are a first command to adjust the phase so as to change the distribution ratio of electric power and a second command as to whether to adjust the phase with respect to the beat as illustrated in FIG. 14.

Here, the controller 15 of the power transmitter 10 is set to transmit, to the power receivers 100A and 100B via the antenna 16, the commands to adjust the phases. Here, for example, in a case where the phase of the driving signal of the power receiver 100A is adjusted to decrease the amount of received electric power of the power receiver 100A, the first command transmitted to the power receiver 100B is a command to adjust the phase to be 0 degrees (the origin of the phase). In other words, a command not to adjust the phase.

Further, for the second command of the command to adjust the phase, the content of the command may be set depending on whether to adjust the phase with respect to the beat for each of the power receivers 100A and 100B.

The controller 150A of the power receiver 100A sets the command to adjust the phase to the driving signal in step S5A and the controller 150B of the power receiver 100B sets the command to adjust the phase to the driving signal in step SSB. Here, for example, in a case where the phase of the driving signal of the power receiver 100A is adjusted, the controller 150B of the power receiver 100B does not adjust the phase.

The power transmitter 10 starts to transmit electric power in step S6. For example, the process of step S6 may be executed when it is reported to the power transmitter 10 that the controller 150A and 150B have completed the setting of the commands to adjust the phases to the driving signals.

Here, a method of obtaining the data representing the efficiencies of electric power reception of the power receivers 100A and 100B will be described with reference to FIG. 17 and FIG. 18.

Figure 17:
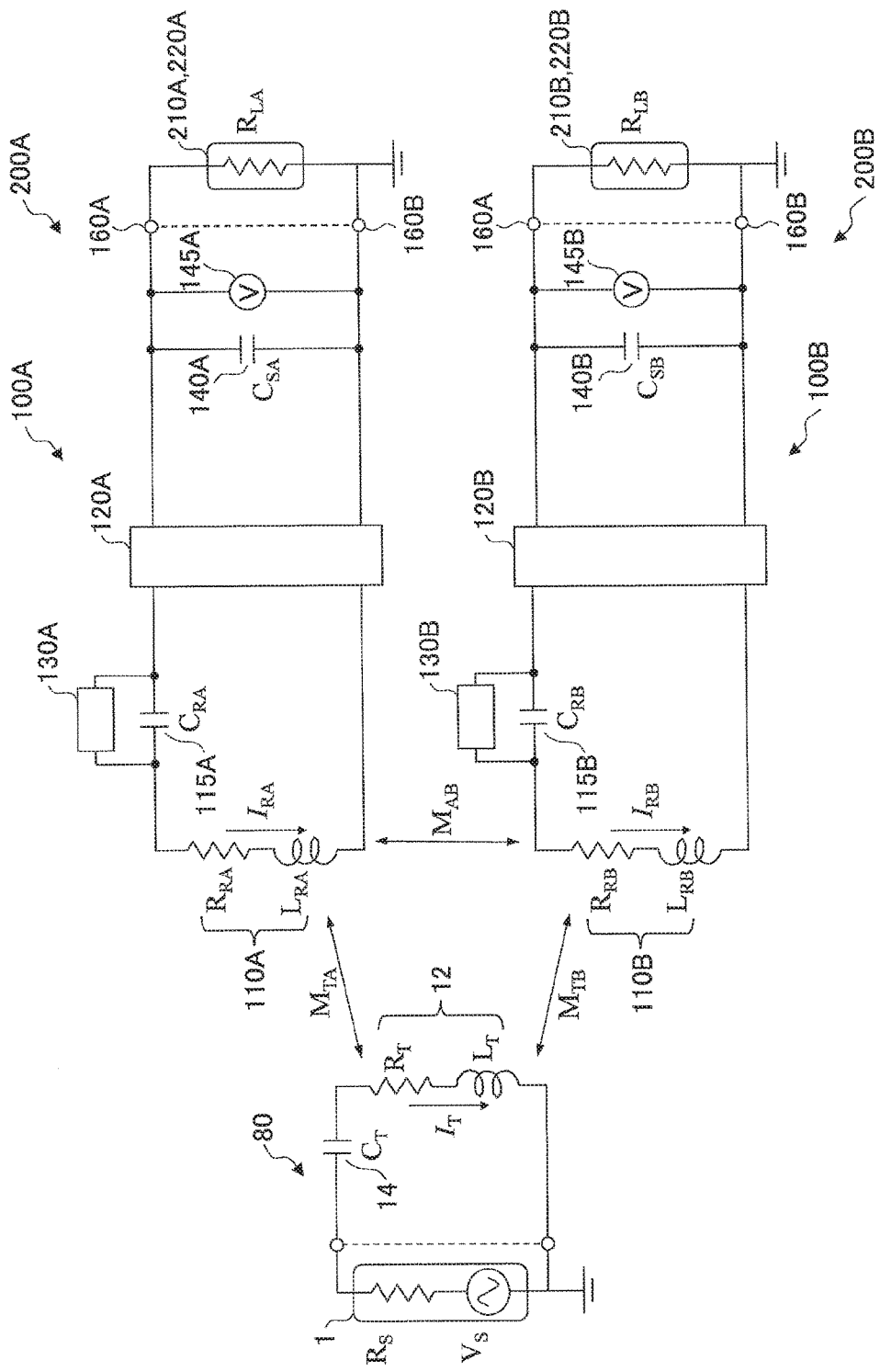
FIG. 17 is a diagram illustrating equivalent circuits of the power transmitting apparatus and the electronic devices.
Figure 21:
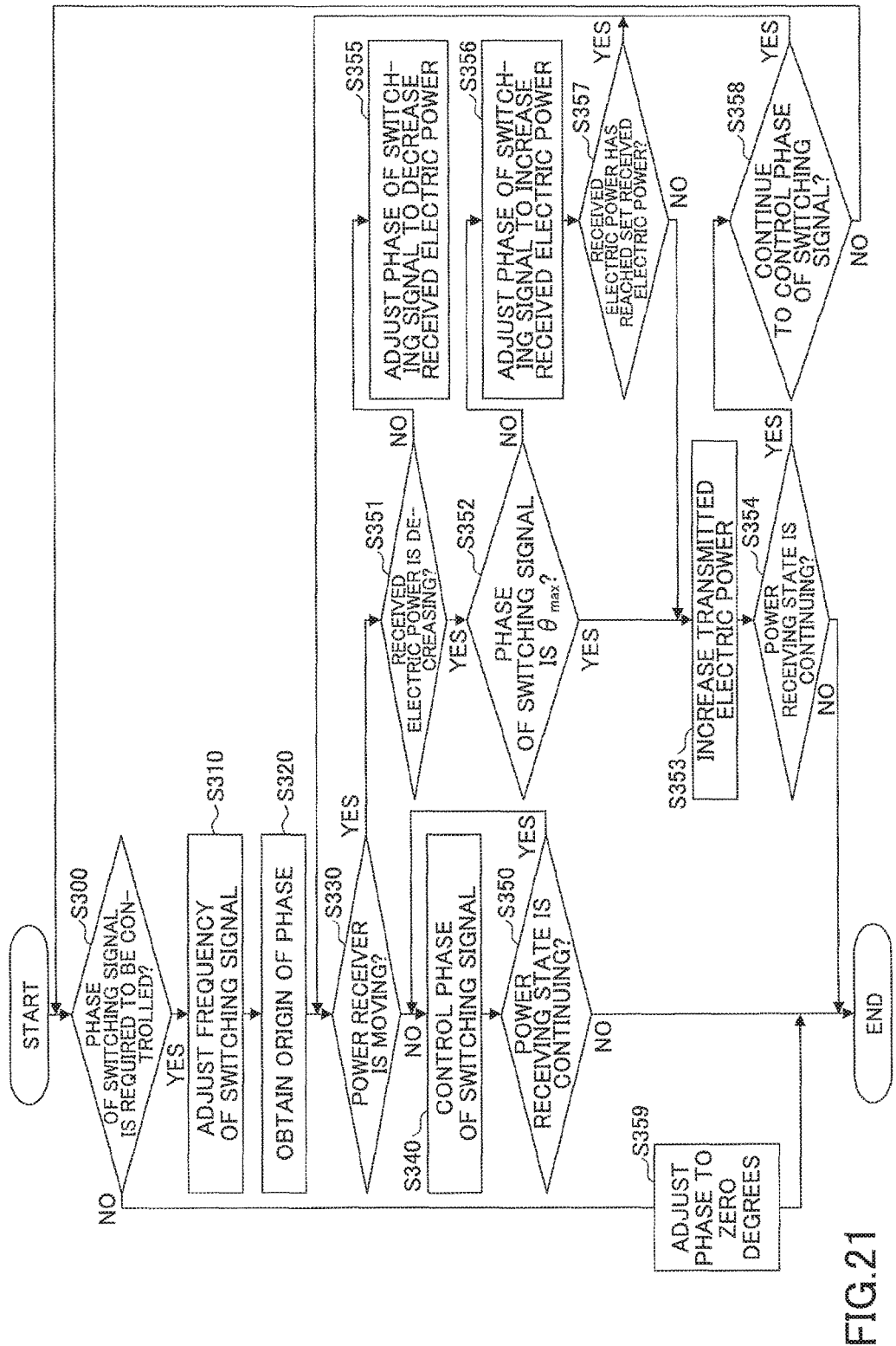
FIG. 21 is a flowchart illustrating a process that is executed by the power receiver.

FIG. 17 is a diagram illustrating equivalent circuits of the power transmitting apparatus 80 and the electronic devices 200A and 200B. The equivalent circuits illustrated in FIG. 17 correspond to the power transmitting apparatus 80 and the electronic devices 200A and 200B illustrated in FIG. 9. However, in the following description, the power transmitting apparatus 80 does not include a primary-side coil 11, and the primary-side resonant coil 12 is directly coupled to the AC power source 1. Further, the power receivers 100A and 100B respectively include the voltmeters 145A and 145B.

In FIG. 17, the secondary-side resonant coil 110A is a coil $L_{RA}$ and a resistor $R_{RA}$, and the capacitor 115A is a capacitor $C_{RA}$. Further, the smoothing capacitor 140A is a capacitor $C_{SA}$, and the DC-DC converter 210A and the battery 220A are a resistor $R_{LA}$.

Similarly, the secondary-side resonant coil 110B is a coil $L_{RB}$ and a resistor $R_{RB}$, and the capacitor 115B is a capacitor $C_{RB}$. Further, the smoothing capacitor 140B is a capacitor $C_{SB}$, and the DC-DC converter 210B and the battery 220B are a resistor $R_{LB}$.

Further, the primary-side resonant coil 12 of the power transmitting apparatus 80 is a resistor $R_T$ and a coil $L_T$, and the AC power source 1 is a power source $V_S$ and a resistor $R_S$. Further, the capacitor 14 is a capacitor $C_T$.

A mutual inductance between the power transmitting apparatus 80 and the electronic device 200A is $M_{TA}$, a mutual inductance between the power transmitting apparatus 80 and the electronic device 200B is $M_{TB}$, and a mutual inductance between the electronic device 200A and the electronic device 200B is $M_{AB}$.

Here, because the mutual inductance $M_{AB}$ is negligibly smaller than the mutual inductance $M_{TA}$ and the mutual inductance $M_{TB}$, the mutual inductance $M_{TA}$ and the mutual inductance $M_{TB}$ are discussed here.

The mutual inductance $M_{TA}$ is determined depending on the efficiency of electric power reception of the power receiver 100A of the electronic device 200A with the power transmitting apparatus 80. This is because the efficiency of electric power reception is determined depending on a position (distance) and an orientation (angle) of the power receiver 100A with respect to the power transmitting apparatus 80. Similarly, the mutual inductance $M_{TB}$ is determined depending on the efficiency of electric power reception of the power receiver 100B of the electronic device 200B with the power transmitting apparatus 80.

The efficiency of electric power reception of the power receiver 100A can be calculated by transmitting electric power from the power transmitter 10 to the power receiver 100A and measuring the amount of the electric power received by the power receiver 100A in a state of turning off the power receiver 100B. Similarly, the efficiency of electric power reception of the power receiver 100B can be calculated by transmitting electric power from the power transmitter 10 to the power receiver 100B and measuring the amount of the electric power received by the power receiver 100B in a state of turning off the power receiver 100A.

Accordingly, the mutual inductance $M_{TA}$ and the mutual inductance $M_{TB}$ can be obtained by obtaining the efficiency of electric power reception of the power receiver 100A alone and the efficiency of electric power reception of the power receiver 100B alone.

According to the first embodiment, the phase of the driving signal that drives the adjuster 130A or the adjuster 130B is changed in order to change the ratios of the efficiencies of electric power reception of the secondary-side resonant coils 110A and 110B of the power receivers 100A and 100B.

Hence, table data is prepared in advance that associates phases with relationships between mutual inductances $M_{TA}$ and mutual inductances $M_{TB}$. Then, the phases of the driving signals are adjusted by using such table data.

FIGS. 18A and 18B are diagrams illustrating table data that associates phases with relationships between mutual inductances $M_{TA}$ and mutual inductances $M_{TB}$.

FIG. 18A is table data for adjusting the phase of the driving signal that drives the adjuster 130A in a state in which the phase of the driving signal that drives the adjuster 130B is fixed to 0 degrees.

Mutual inductances $M_{TA1}$, $M_{TA2}$, $M_{TA3}$, ... take specific values of mutual inductance $M_{TA}$ in practice. Similarly, mutual inductances $M_{TB1}$, $M_{TB2}$, $M_{TB3}$, take specific values of mutual inductance $M_{TB}$ in practice. Phases PH1A, PH2A, PH3A, ..., PH11A, PH12A, PH13A, ... take specific values of phase obtained by simulation or experimentally.

FIG. 18B is table data for adjusting the phase of the driving signal that drives the adjuster 130B in a state in which the phase of the driving signal that drives the adjuster 130A is fixed to 0 degrees.

Mutual inductances $M_{TA1}$, $M_{TA2}$, $M_{TA3}$, ... and mutual inductances $M_{TB1}$, $M_{TB2}$, $M_{TB3}$, ... are similar to those of FIG. 18A. Phases PH1B, PH2B, PH3B, ... PH11B, PH12B, PH13B, ... take specific values of phase obtained by simulation or experimentally.

The table data illustrated in FIGS. 18A and 18B can be created by experimentally trying to optimize the phases with measuring of the mutual inductances $M_{TA}$ and $M_{TB}$ while positions and orientations of the power receivers 100A and 100B with respect to the power transmitter 10 are variously changed.

FIGS. 19A and 19B are diagrams illustrating table data that associates efficiencies of electric power reception with mutual inductances $M_{TA}$ and $M_{TB}$. FIG. 19A is table data that associates respective mutual inductances $M_{TA}$ with efficiencies of electric power reception of the power receiver 100A. FIG. 19B is table data that associates respective mutual inductances $M_{TB}$ with efficiencies of electric power reception of the power receiver 100B.

The mutual inductances $M_{TA}$ and $M_{TB}$ are respectively determined depending on the efficiencies $E_A$ and $E_B$ of electric power reception between the power transmitting apparatus 80 and the power receivers 100A and 100B.

In FIG. 19A, the mutual inductances $M_{TA1}$, $M_{TA2}$, ... are associated with the efficiencies $E_{A1}$, $E_{A2}$, ... of electric power reception of the power receiver 100A. Also, in FIG. 19B, the mutual inductances $M_{TB1}$, $M_{TB2}$, ... are associated with the efficiencies $E_{B1}$, $E_{B2}$, ... of electric power reception of the power receiver 100B.

By previously measuring the efficiencies of electric power reception and the mutual inductances $M_{TA}$ and $M_{TB}$ of the power receivers 100A and 100B through experiments or the like to create table data as illustrated in FIGS. 19A and 19B, the mutual inductances $M_{TA}$ and $M_{TB}$ of the power receivers 100A and 100B can be obtained from the efficiencies of electric power reception of the power receivers 100A and 100B. Alternatively, through a simulation, the mutual inductances $M_{TA}$ and $M_{TB}$ of the power receivers 100A and 100B can be obtained from the efficiencies of electric power reception of the power receivers 100A and 100B.

Next, a method of setting the phases will be described with reference to FIG. 20.

FIG. 20 is a flowchart illustrating a method by which the power transmitter 10 sets the phase of the power receiver 100A or 100B according to the first embodiment. This flow illustrates a process that is executed by the controller 15 of the power transmitter 10 and illustrates details of the process of step S3 of FIG. 16.

The controller 15 starts the process illustrated in FIG. 20, upon proceeding to step S3 by receiving from the power receivers 100A and 100B the signals that represent the received electric power to obtain the efficiencies of electric power reception and receiving from the power receivers 100A and 100B the signals that represent the rated outputs.

The controller 15 calculates a first value, obtained by dividing the rated output of the battery 220A by the efficiency of electric power reception of the secondary-side resonant coil 110A and calculates a second value, obtained by dividing the rated output of the battery 220B by the efficiency of electric power reception of the secondary-side resonant coil 110B, and determines whether the first value is greater than the second value in step S31.

Upon determining that the first value is greater than the second value (YES in step S31), the controller 15 sets the phase of the driving signal that drives the adjuster 130A of the power receiver 100A to be 0 degrees in step S31A. Setting the phase to be zero degrees means setting the phase to be the origin of the phase.

Note that the origin of the phase may be obtained by causing the phase shift circuit 153 to change the phase of the driving signal and by detecting the received electric power calculated by the processor 151 based on the detected voltage of the voltmeter 145 to obtain the phase $\theta_0$ that gives the maximum value $P_{MAX}$ of the received electric power illustrated in FIG. 15.

Next, the controller 15 sets a phase of the driving signal that drives the adjuster 130B of the power receiver 100B in step S32A. Specifically, based on the table data illustrated in FIGS. 19A and 19B, the controller 15 obtains the mutual inductances $M_{TA}$ and $M_{TB}$ of the power receivers 100A and 100B from the efficiencies $E_A$ and $E_B$ of electric power reception of the power receivers 100A and 100B respectively. Then, from the table data illustrated in FIG. 18B, the controller 15 obtains the phase of the driving signal that drives the adjuster 130B of the power receiver 100B based on the mutual inductances $M_{TA}$ and $M_{TB}$ of the power receivers 100A and 100B.

When the process of step S32A is completed, the controller 15 causes the flow to proceed to step S4 (see FIG. 16).

Upon determining that the first value is less than the second value (NO in step S31), the controller 15 sets the phase of the driving signal that drives the adjuster 130B of the power receiver 100B to be 0 degrees in step S31B. Setting the phase to be zero degrees means setting the origin of the phase.

Next, the controller 15 sets a phase of the driving signal that drives the adjuster 130A of the power receiver 100A in step S32B. Specifically, based on the table data illustrated in FIGS. 19A and 19B, the controller 15 obtains the mutual inductances $M_{TA}$ and $M_{TB}$ of the power receivers 100A and 100B from the efficiencies $E_A$ and $E_B$ of electric power reception of the power receivers 100A and 100B respectively. Then, from the table data illustrated in FIG. 18A, the controller 15 obtains the phase of the driving signal that drives the adjuster 130A of the power receiver 100A based on the mutual inductances $M_{TA}$ and $M_{TB}$ of the power receivers 100A and 100B.

When the process of step S32B is completed, the controller 15 causes the flow to proceed to step S4 (see FIG. 16).

In this way, the controller 15 sets the phases of the driving signals for driving the adjusters 130A and 130B of the power receivers 100A and 100B.

FIG. 21 to FIG. 24 are flowcharts illustrating processes executed by the controller 150.

Here, the clock signals CLK1 and CLK2 are referred to as the switching signal for switching the switches 131X and 131Y.

The controller 150 determines whether it is required to control the phase of the switching signal in step S300. As to whether it is required to control the phase of the switching signal depends on contents of the first command and the second command included in the command to adjust the phase received from the power transmitter 10.

A case in which the first command represents an adjustment of the phase for changing the distribution ratio of electric power is a case in which it is required to control the phase of the switching signal. Further, a case in which the second command represents an adjustment of the phase with respect to the beat is a case in which it is required to control the phase of the switching signal.

A case in which it is not required to control the phase of the switching signal is a case in which the first command represents that an adjustment of the phase for changing the distribution ratio of electric power is not to be performed and the second command represents that an adjustment of the phase with respect to the beat is not to be performed.

Upon determining that it is required to control the phase of the switching signal (YES in step S300), the controller 150 adjusts the frequency of the switching signal in step S310. Although details of step S310 will be described later below with reference to FIG. 22, in step S310, the controller 150 adjusts the frequencies of the clock signals CLK1 and CLK2 such that the elapsed time $t_X$ is sufficiently longer than the transient response period $t_P$.

The controller 150 obtains the origin of the phase in step S320. Although details of step S320 will be described later below with reference to FIG. 23, in step S320, the controller 150 obtains the origin of the phase as described with reference to FIG. 15.

The controller 150 determines whether the power receiver 100 (itself) is moving in step S330. For example, based on a detection value of the acceleration sensor 41 (see FIG. 4) built in the electronic device including the controller 150, the controller 150 may determine whether the power receiver 100 (itself) is moving.

The reason why the controller 150 determines whether the power receiver 100 (itself) is moving in step S330 is for performing a process to isolate whether a decrease of the received electric power is caused by the controller 150 being located away from the power transmitter 10 or is a decrease due to a beat of the received electric power.

Upon determining that the power receiver 100 (itself) is not moving (NO in step S330), the controller 150 controls the phase of the switching signal in step S340. Although details of step S340 will be described later below with reference to FIG. 24, in step S340, the controller 150 controls the phase of the switching signal to increase the received electric power decreased by the beat.

The controller 150 determines whether a power receiving state is continuing in step S350. The determination in step S350 may be made based on whether the power receiver 100 (itself) is receiving the electric power.

Upon determining that a power receiving state is continuing (YES in step S350), the controller 150 returns the flow to step S340. As a result, the controller 150 controls the phase of the switching signal to increase the received electric power decreased by the beat.

Upon determining that a power receiving state is not continuing (NO in step S350), the controller 150 completes the process series (END).

Upon determining that the power receiver 100 is moving (YES in step S330), the controller 150 determines whether the received electric power is decreasing in step S351.

Upon determining that the received electric power is decreasing (YES in step S351), the controller 150 determines whether the phase of the switching signal is the maximum value $\theta_{MAX}$ in step S352. It may be determined by the received electric power calculated by the processor 151 based on the detected voltage of the voltmeter 145 as to whether the received electric power is decreasing.

The maximum value $\theta_{MAX}$ is the maximum value of the adjustment range of the phase of the switching signal. That is, step S352 is a step for determining whether the phase of the switching signal can be further adjusted. The maximum value $\theta_{MAX}$ is 360 degrees.

A case of reaching step S352 is a state in which the received electric power is decreasing and there is no longer marching for adjusting the phase of the switching signal. In such a case, the transmitted electric power of the power transmitter 10 is increased.

Upon determining that the phase of the switching signal is the maximum value $\theta_{MAX}$ (YES in step S352), the controller 150 transmits, to the power transmitter 10, a command to increase the transmitted electric power in step S353. The controller 150 transmits, to the power transmitter 10 through wireless communication, the command to increase the transmitted electric power. This process is executed by the processor 151.

The controller 150 determines whether the power receiving state is continuing in step 5354. The determination in step S354 may be made based on whether the power receiver 100 (itself) is receiving the electric power.

Upon determining that a power receiving state is not continuing (NO in step S354), the controller 150 completes the process series (END).

Upon determining that a power receiving state is continuing (YES in step S354), the controller 150 determines whether to continue to control the phase of the switching signal in step S358. Whether to continue to control the phase of the switching signal depends on contents of the first command and the second command included in the command to adjust the phase received from the power transmitter 10.

Upon determining that the received electric power is not decreasing (NO in step S351), the controller 150 adjusts the phase of the switching signal to decrease the received electric power in step S355. Because a case in which the power receiver 100 (itself) is moving and the received electric power is increasing is a case in which the power receiver 100 (itself) is approaching the power transmitter 10, the amount of received electric power is decreased.

Upon completing the process of step S355, the controller 150 returns the flow to step S300.

Upon determining that the phase of the switching signal is not the maximum value $\theta_{MAX}$ (NO in step S352), the controller 150 adjusts the phase of the switching signal to increase the received electric power in step S356. Because a case in which the power receiver 100 (itself) is moving and the received electric power is decreasing is a case in which the power receiver 100 (itself) is becoming more distant from the power transmitter 10, the amount of received electric power is increased.

Upon completing the process of step S356, the controller 150 determines whether the received electric power has reached the set received electric power in step S357. The set received electric power is electric power determined by the first command. The process of step S357 is performed by the processor 151 determining whether the received electric power calculated by the processor 151 based on the detected voltage of the voltmeter 145 has reached the electric power determined by the first command.

Upon determining that the received electric power has reached the set received electric power (YES in step S357), the controller 150 returns the flow to step S300.

Upon determining that the received electric power has not reached the set received electric power (NO in step S357), the controller 150 causes the flow to proceed to step S353.

Upon determining that it is not required to control the phase of the switching signal (NO in step S300), the controller 150 adjusts the phase to be zero degrees (the origin of the phase) in step S359. Upon completing the process of step S359, the process series ends (END).

As described above, the flow illustrated in FIG. 21 is completed.

Figure 22:
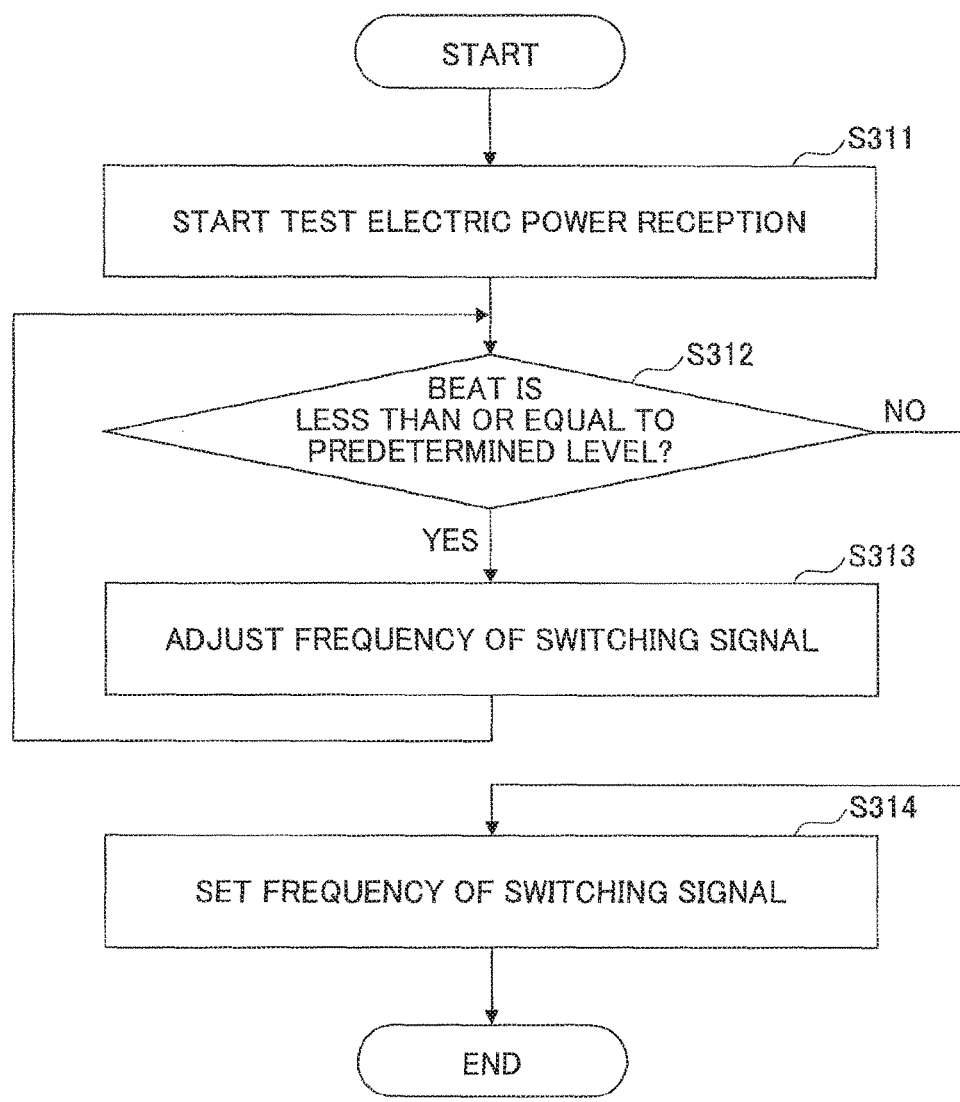
FIG. 22 is a flowchart illustrating a process that is executed by the power receiver.

Next, the flowchart illustrated in FIG. 22 will be described.

The controller 150 starts test electric power reception in step S311. The test electric power reception is for testing a power receiving state by causing the power transmitter 10 to transmit predetermined electric power set in advance. Here, because it is sufficient to determine whether a beat is present in the received electric power, the predetermined electric power set in advance may be very low electric power.

The controller 150 determines whether the beat of the received electric power is less than or equal to a predetermined level in step S312. For example, whether the beat is less than or equal to the predetermined level may be determined by determining whether a decrease degree of the beat with respect to time change is less than or equal to a predetermined value, which is sufficiently small, and the frequency of the beat is sufficiently low.

Upon determining that the beat of the received electric power is less than or equal to the predetermined level (YES in step S312), the controller 150 adjusts the frequency of the switching signal in step S313. In step S313, the controller 150 adjusts the frequencies of the clock signals CLK1 and CLK2 such that the elapsed time $t_X$ is sufficiently longer than the transient response period $t_P$.

Upon completing the process of step S313, the controller 150 returns the flow to step S312.

Upon determining that the beat of the received electric power is greater than the predetermined level (NO in step S312), the controller 150 sets the frequency of the switching signal to be the value at that time in step S314.

As described above, the process of step S310 of adjusting the frequency of the switching signal is completed (END).

Figure 23:
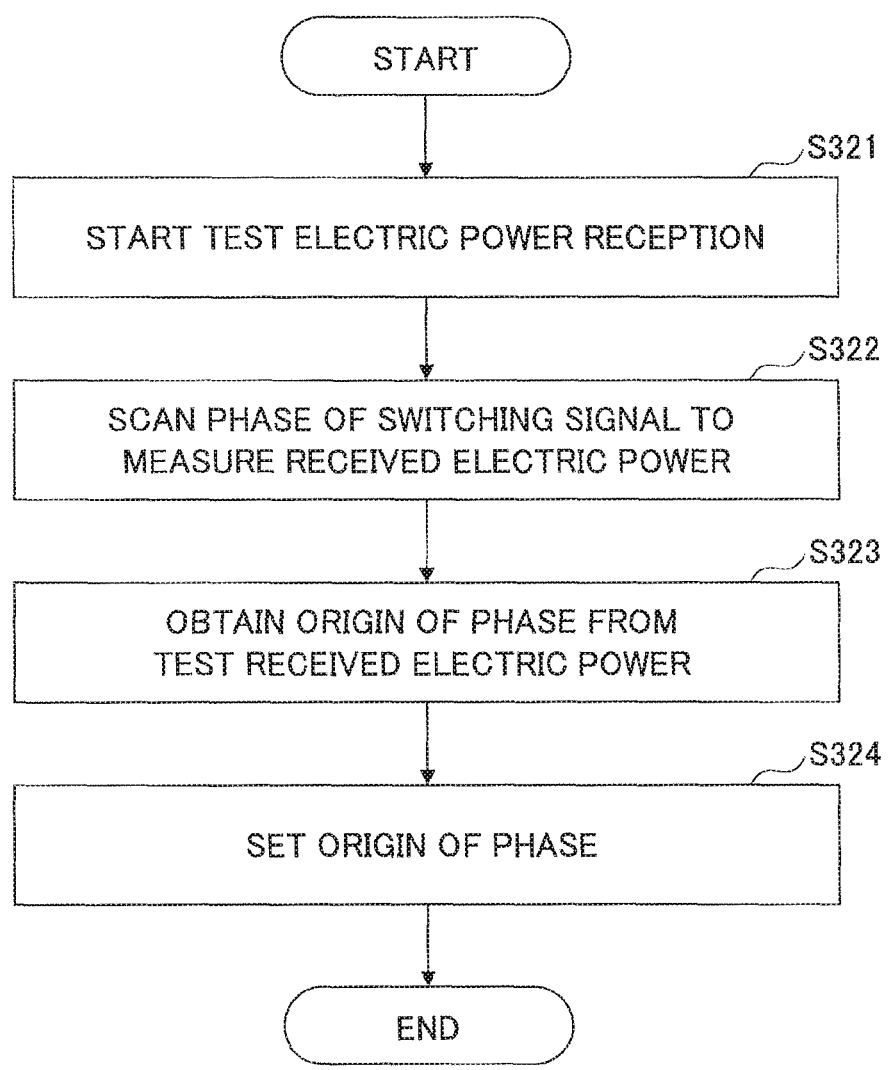
FIG. 23 is a flowchart illustrating a process that is executed by the power receiver.

Next, the flowchart illustrated in FIG. 23 will be described.

The controller 150 starts test electric power reception in step S321. The test electric power reception is for testing a power receiving state by causing the power transmitter 10 to transmit a predetermined electric power set in advance. Here, because it is enough to determine whether the received electric power has a beat, the predetermined electric power set in advance may be very low electric power.

The controller 150 scans the phase of the switching signal to measure the received electric power in step S322. When scanning the phase of the switching signal, while causing the phase shift circuit 153 to shift the phase of the switching signal by 360 degrees, the processor 151 may measure the received electric power based on the detected voltage of the voltmeter 145. Thereby, the property as illustrated in FIG. 15 is obtained.

The controller 150 obtains, from the property obtained in step S322, the phase, at which the received electric power becomes the maximum, as the origin of the phase in step S323.

The controller 150 sets the origin of the phase obtained in step S323 to the switching signal in step S324. Specifically, the phase controller 154 may hold a value that represents the origin of the phase and set the value to the phase shift circuit 153.

As described above, the process of step S320 in which the origin of the phase is obtained is completed (END).

Figure 24:
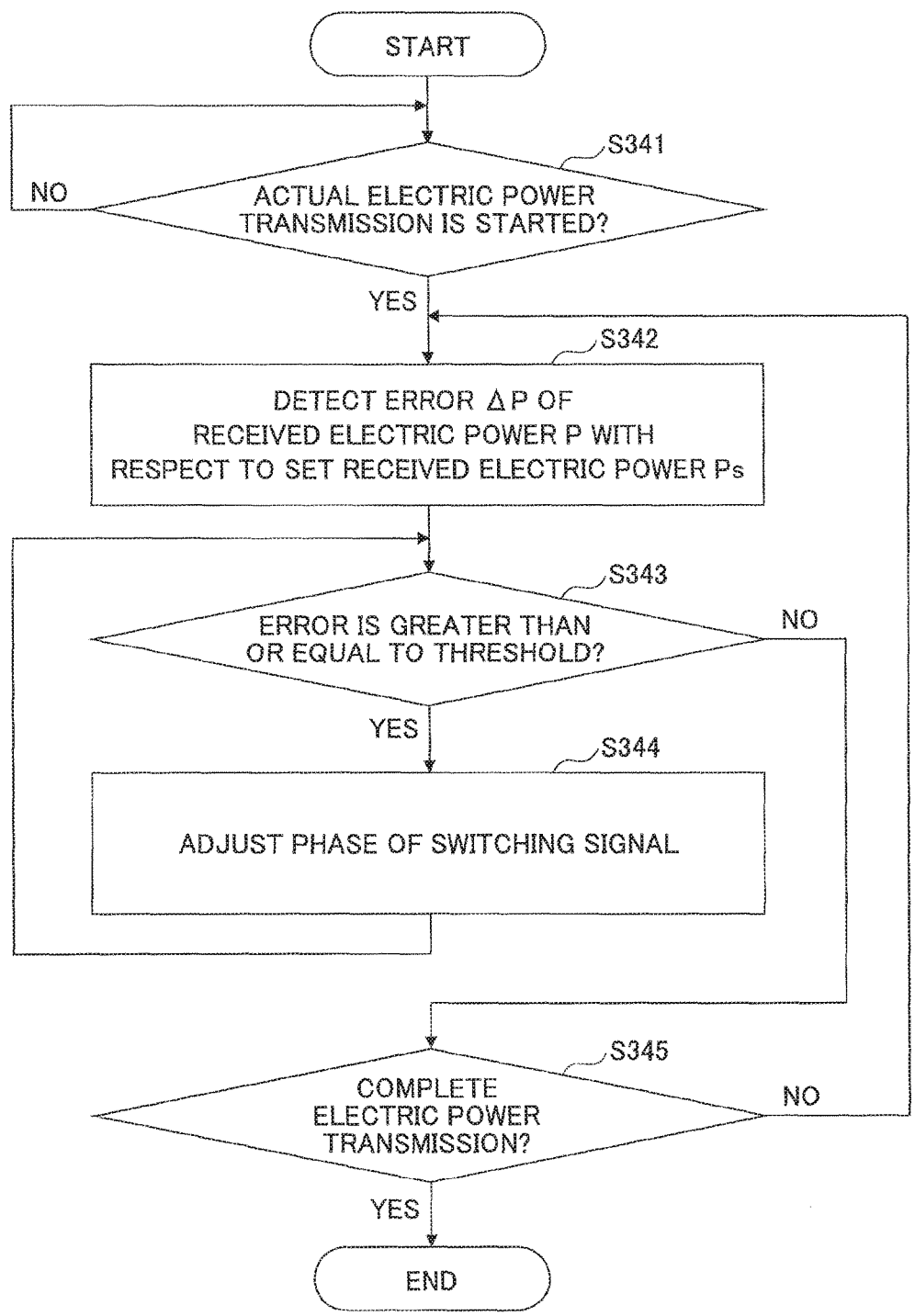
FIG. 24 is a flowchart illustrating a process that is executed by the power receiver.

Next, the flowchart illustrated in FIG. 24 will be described.

The controller 150 determines whether actual electric power transmission is started in step S331. For example, the determination as to whether actual electric power transmission is started may be made by determining whether a notification signal that represents that actual power transmission is started is received from the power transmitter 10.

The controller 150 detects an error ΔP of the received electric power P calculated by the processor 151 with respect to the set received electric power Ps in step S342. The set received electric power Ps is the same as the set received electric power in step S357. The error ΔP is obtained by subtracting the received electric power P from the set received electric power Ps.

The controller 150 determines whether the error ΔP is greater than or equal to a threshold in step S343.

Upon determining that the error ΔP is greater than or equal to the threshold (YES in step S343), the controller 150 adjusts the phase of the switching signal in step S344.

In a case where the phase in an operating state before the adjustment is in a range in which the phase is positive as illustrated by the horizontal axis of FIG. 8, the controller 150 may decrease the phase so as to increase the received electric power. For example, in a case where the phase before the adjustment is 30 degrees, the phase may be made closer to 0 degrees relative to 30 degrees so as to be decreased.

In a case where the phase in an operating state before the adjustment is in a range in which the phase is negative as illustrated by the horizontal axis of FIG. 8, the controller 150 may increase the phase so as to increase the received electric power. For example, in a case where the phase before the adjustment is −30 degrees, the phase may be made closer to 0 degrees relative to −30 degrees so as to be increased.

Upon determining that the error ΔP is less than the threshold (NO in step S343), the controller 150 determines whether to complete the electric power transmission in step S345. For example, the determination as to whether to complete the electric power transmission may be made by determining whether the power receiver 100 received, from the power transmitter 10, a signal that represents completion of the electric power transmission.

As described above, according to the first embodiment, the required amount of electric power to be transmitted to the power receiver 100A and the required amount of electric power to be transmitted to the power receiver 100B are obtained by the efficiencies of electric power reception of the secondary-side resonant coils 110A and 110B of the power receivers 100A and 100B and the rated outputs of the electronic devices 200A and 200B.

Then, the phase of the driving signal corresponding to the power receiver (100A or 100B) of which the required amount of electric power transmission is smaller among the power receivers 100A and 100B is changed from the origin of the phase.

As a result, it is possible to reduce the amount of electric power supplied to the power receiver (100A or 100B) of which the required amount of electric power transmission is smaller and to increase the amount of electric power supplied to the power receiver (100A or 100B) of which the required amount of electric power transmission is larger.

In this way, the balance between the amount of electric power supplied to the power receiver 100A and the amount of electric power supplied to the power receiver 100B is improved.

Thus, according to the first embodiment, it is possible to provide the power receiver 100A or 100B that can improve the balance of supplied amounts of electric power. Further, according to the first embodiment, it is possible to provide the power transmitting system 400 that can improve the balance of supply amounts of electric power.

Further, according to the first embodiment, the frequencies of the clock signals CLK1 and CLK2 are adjusted such that the elapsed time $t_X$ until the received electric power decreases by X % is sufficiently longer than the transient response period tp from adjusting the phases of the clock signals CLK1 and CLK2 until the electric power becomes stable.

Hence, the change of the received electric power due to the periods of the beats can be reduced, and a rapid change in the received electric power can be reduced.

Further, according to the first embodiment, upon the error AP being increased by the beat of the received electric power, the phases of the clock signals CLK1 and CLK2 (switching signal) are adjusted to increase the received electric power. Hence, it is possible to reduce a decrease of the received electric power due to the beat, and to efficiently receive the electric power.

In the embodiment described above, the origin of the phase is obtained, and the phases of the clock signals (switching signal) are changed from the origin of the phase. However, without obtaining the origin of the phase, the phases of the clock signals CLK1 and CLK2 (switching signal) may be changed. In this case, the data illustrated in FIG. 18 and FIG. 19 is not required to be used.

In a case where the phases of the clock signals CLK1 and CLK2 (switching signal) are changed without obtaining the origin of the phase, the phases may be set after investigating in advance a relationship between the received electric power and the phases through an experiment or the like, for example. Further, whether to bring forward the phases or to delay the phases may be set after investigating in advance a relationship between the received electric power and the phases.

Further, in the above described embodiment, the balance between the amount of electric power supplied to the power receiver 100A and the amount of electric power supplied to the power receiver 100B is improved by reducing the phase of the driving signal corresponding to the power receiver (100A or 100B) of which the required amount of electric power transmission is smaller among the two power receivers 100A and 100B.

However, there may be a case where three or more power receivers are charged at the same time. In such a case, phases of driving signals of power receivers other than a power receiver of which the required amount of electric power is largest, among amounts of electric power obtained by dividing respective rated outputs by efficiencies of electric power reception, may be reduced.

Further, in the above embodiment described as an example, each of the electronic devices 200A and 200B is a terminal device such as a tablet computer or a smartphone. However, each of the electronic devices 200A and 200B may be any electronic device that includes a chargeable battery such as a note Personal Computer (PC), a portable phone terminal, a portable game machine, a digital camera, or a video camera, for example.

Further, in the embodiment described above, the phases are obtained depending on the efficiencies of electric power reception and the rated outputs of the two power receivers 100A and 100B, and the controller 150A or 150B adjusts the phase of the driving signal for driving the switches 131X and 131Y.

However, in a case where electric power is transmitted between a single power transmitter 10 and a single power receiver 100 (see FIG. 4), the controller 150 of the power receiver 100 may drive the switches 131X and 131Y by using phases obtained in advance through an experiment or the like. In this case, it is not necessary to store data representing the rated output of the battery 220 in an internal memory of the controller 150.

Also, in the case where electric power is transmitted between a single power transmitter 10 and a single power receiver 100 (see FIG. 4), the controller 150 of the power receiver 100 may adjust the phases of the clock signals CLK1 and CLK2 to adjust the received electric power. In this case, it is not necessary to detect the phases that maximize the electric power received by the power receiver 100.

Further, in the above description of the embodiment, the power receivers 100A and 100B simultaneously charge the batteries 220A and 220B. However, the electronic devices 200A and 200B may operate to directly consume electric power, received by the power receivers 100A and 100B, without including the batteries 220A and 220B. Even in the case where the electronic devices 200A and 200B do not include the batteries 220A and 220B, it is possible to drive the electronic devices 200A and 200B at the same time because the power receivers 100A and 100B can receive electric power simultaneously and efficiently. This is one merit of the case of simultaneously receiving electric power because this is impossible in a case of receiving electric power in a time-division manner. In such a case, phases may be set by using rated outputs required for driving the electronic devices 200A and 200B.

Also, so far, the embodiment has been described in which the controller 15 of the power transmitter 10 generates the driving signals to be transmitted to the power receivers 100A and 100B. However, the power transmitter 10 may transmit data representing transmission power of the power transmitter 10 to the power receivers 100A and 100B, and the power receivers 100A and 100B may generate the driving signals, respectively. In this case, the power receivers 100A and 100B may execute data communication with each other to determine which of the power receivers 100A and 100B has greater electric power to be received so that at least one of the power receivers 100A and 100B generates a driving signal to increase the phase of the driving signal of the power receiver 100A or 100B having the smaller power to be received.

Alternatively, the power transmitter 10 may receive the data representing the received electric power and the rated output from each of the power receivers 100A and 100B, and cause the controller 150A or 150B of the power receiver 100A or 100B, of which the required amount of electric power transmission is smaller, to adjust the phase. In this case, the controller 150A or 150B may store the data required for adjusting the phase in an internal memory.

Figure 25:
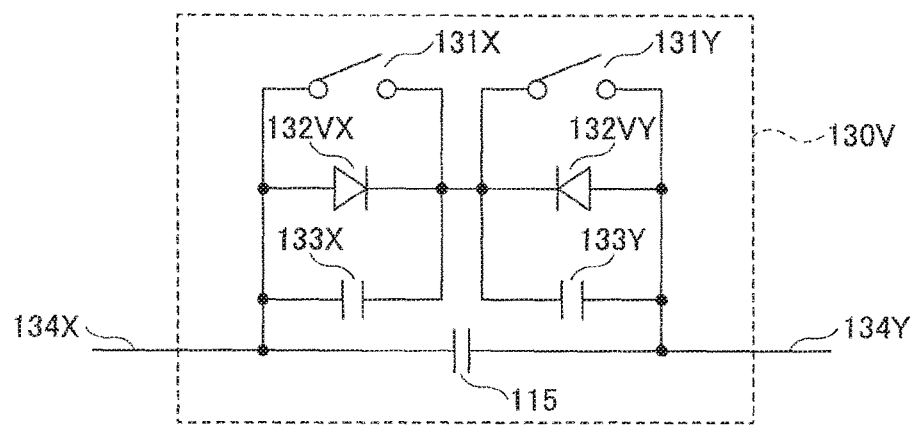
FIG. 25 is a diagram illustrating an adjuster according to a variation example of the first embodiment.

Also, the directions of the diodes 132X and 132Y of the adjuster 130 may be opposite to the directions illustrated in FIG. 4. FIG. 25 is a diagram illustrating an adjuster 130V according to a variation example of the first embodiment.

The adjuster 130V includes switches 131X and 131Y, diodes 132VX and 132VY, capacitors 133X and 133Y, and terminals 134X and 134Y. The rectification directions of the diode 132VX and 132VY are opposite to those of the diodes 132X and 132Y illustrated in FIG. 4, respectively. Other than this, the adjuster 130V is similar to the adjuster 130 illustrated in FIG. 4. Therefore, the same reference numerals are assigned to the same components, and their descriptions are omitted.

Figure 26:
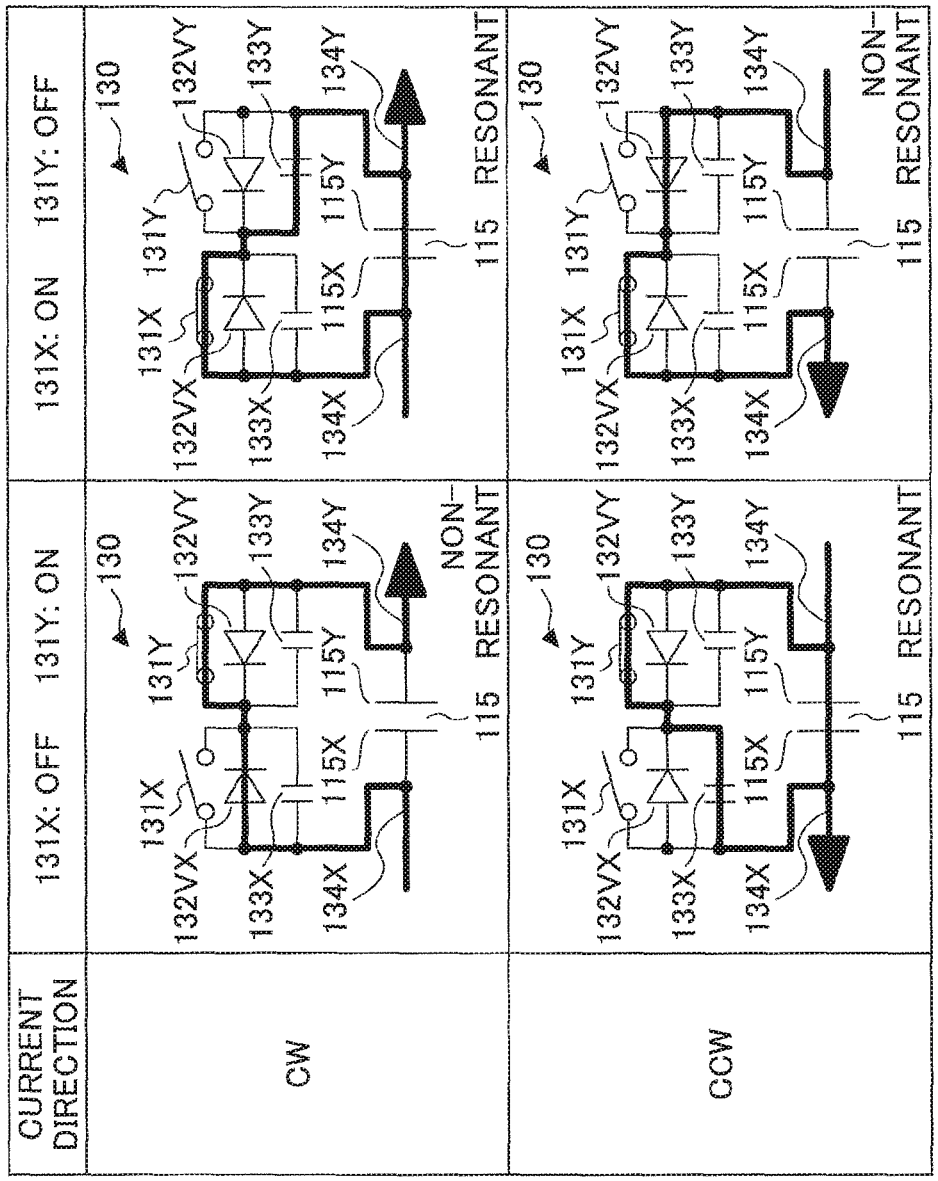
FIG. 26 is a diagram illustrating current paths in the capacitor and the adjuster.

FIG. 26 is a diagram illustrating current paths in the capacitor 115 and the adjuster 130V. In FIG. 26, an electric current direction will be referred to as the clockwise (CW) direction for an electric current flowing from the terminal 134X to the terminal 134Y through the capacitor 115 or the inside of the adjuster 130V. Also, an electric current direction will be referred to as the counterclockwise (CCW) direction for an electric current flowing from the terminal 134Y to the terminal 134X through the capacitor 115 or the inside of the adjuster 130V.

When the switch 131X is off, the switch 131Y is on, and an electric current flows clockwise (CW), the current path generated in the adjuster 130V goes from the terminal 134X to the terminal 134Y through the diode 132VX and the switch 131Y. Because this electric current path is parallel with the capacitor 115, the current stops flowing in the capacitor 115. Therefore, the resonance current does not flow in the secondary-side resonant coil 110.

When the switch 131X is off, the switch 131Y is on, and an electric current flows counterclockwise (CCW), a resonance current flows in the adjuster 130V in the direction from the terminal 134Y to the terminal 134X through the switch 131Y the capacitor 133X and the resonance current flows in the capacitor 115 from the terminal 115Y to the terminal 115X. Therefore, the resonance current flows in the secondary-side resonant coil 110 in the counterclockwise direction.

When the switch 131X is on, the switch 131Y is off, and an electric current flows clockwise (CW), a resonance current flows in the adjuster 130V in the direction from the terminal 134X to the terminal 134Y through the switch 131X and the capacitor 133Y, and the resonance current flows in the capacitor 115 from the terminal 115X to the terminal 115Y. Therefore, the resonance current flows in the secondary-side resonant coil 110 in the clockwise direction.

When the switch 131X is on, the switch 131Y is off, and an electric current flows counterclockwise (CCW), the current path generated in the adjuster 130V goes from the terminal 134Y to the terminal 134X through the diode 132VY and the switch 131X. Because this electric current path is parallel with the capacitor 115, the electric current stops flowing in the capacitor 115. Therefore, the resonance current does not flow in the secondary-side resonant coil 110.

Second Embodiment

Figure 27:
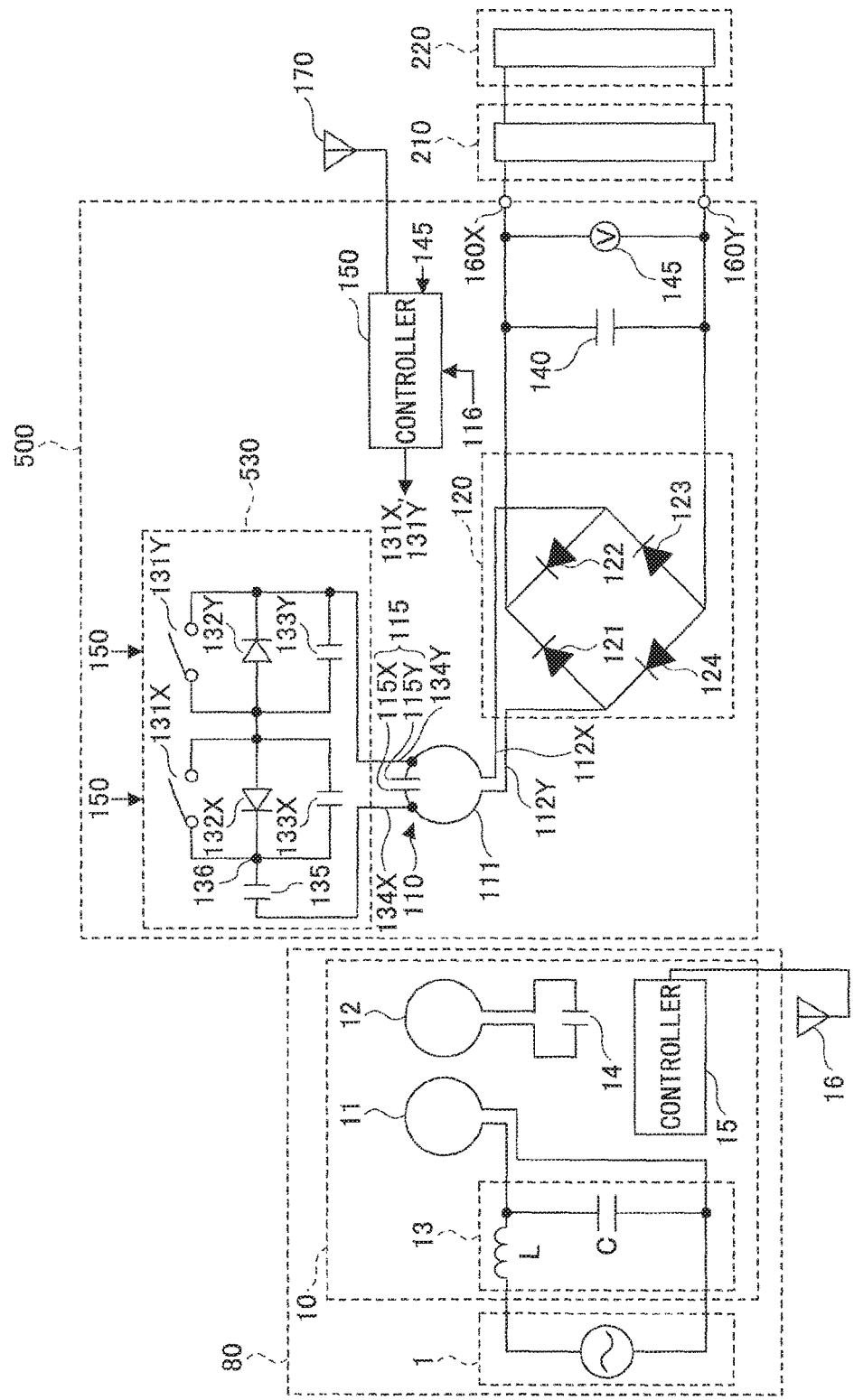
FIG. 27 is a diagram illustrating a power transmitting apparatus and a power receiver according to a second embodiment.

FIG. 27 is a diagram illustrating a power transmitting apparatus 80 and the power receiver 100 according to a second embodiment. The power transmitting apparatus 80 includes an alternating-current (AC) power source 1 and a power transmitter 10. In the following, the same reference numerals are assigned to components similar to the components of the first embodiment, and their descriptions are omitted as appropriate.

The power transmitting apparatus 80 includes the AC power source 1 and the power transmitter 10.

The power transmitter 10 includes a primary-side coil 11, a primary-side resonant coil 12, a matching circuit 13, a capacitor 14, a controller 15, and an antenna 16.

The power receiver 500 includes a secondary-side resonant coil 110, a capacitor 115, a rectifier circuit 120, an adjuster 530, a smoothing capacitor 140, a controller 150, a voltmeter 160V, output terminals 160X and 160Y, and an antenna 170. A DC-DC converter 210 is coupled to the output terminals 160X and 160Y, and a battery 220 is coupled to an output side of the DC-DC converter 210.

First, the power transmitter 10 will be described. As illustrated in FIG. 27, the primary-side coil 11 is a loop-shaped coil, and is coupled to the AC power source 1 via the matching circuit 13 between two ends of the primary-side coil 11. The primary-side coil 11 is disposed close to but not in contact with the primary-side resonant coil 12. The primary-side coil 11 is electromagnetically coupled to the primary-side resonant coil 12. The primary-side coil 11 is disposed such that the central axis of the primary-side coil 11 matches the central axis of the primary-side resonant coil 12. The central axis of the primary-side coil 11 and the central axis of the primary-side resonant coil 12 are made to match each other in order to inhibit leakage of magnetic flux and to inhibit unnecessary generation of magnetic fields around the primary-side coil 11 and the primary-side resonant coil 12, as well as improving the coupling strength between the primary-side coil 11 and the primary-side resonant coil 12.

The primary-side coil 11 generates magnetic fields by alternating-current (AC) power supplied from the AC power source 1 via the matching circuit 13, and transmits the electric power to the primary-side resonant coil 12 by electromagnetic induction (mutual induction).

As illustrated in FIG. 27, the primary-side resonant coil 12 is disposed close to but not in contact with the primary-side coil 11. The primary-side resonant coil 12 is electromagnetically coupled to the primary-side coil 11. Further, the primary-side resonant coil 12 has a predetermined resonance frequency and is designed to have a very high Q factor. The resonance frequency of the primary-side resonant coil 12 is set to be equal to the resonance frequency of the secondary-side resonant coil 110. The capacitor 14 for adjusting the resonance frequency is coupled in series between the two ends of the primary-side resonant coil 12.

The resonance frequency of the primary-side resonant coil 12 is set to be equal to the frequency of the AC power that the AC power source 1 outputs. The resonance frequency of the primary-side resonant coil 12 is determined depending on an electrostatic capacitance of the capacitor 14 and an inductance of the primary-side resonant coil 12. Hence, the electrostatic capacitance of the capacitor 14 and the inductance of the primary-side resonant coil 12 are set such that the resonance frequency of the primary-side resonant coil 12 is equal to the frequency of the AC power output from the AC power source 1.

The matching circuit 13 is inserted for matching impedance between the primary-side coil 11 and that of the AC power source 1, and includes an inductor L and a capacitor C.

The AC power source 1 is a power source that outputs AC power having a frequency necessary for the magnetic field resonance, and includes an amplifier that amplifies the output power. The AC power source 1 may, for example, output high frequency AC power from several hundreds of kHz to several tens of MHz.

The capacitor 14 is a variable capacitance capacitor inserted in series between the two ends of the primary-side resonant coil 12. The capacitor 14 is disposed for adjusting the resonance frequency of the primary-side resonant coil 12. The electrostatic capacitance of the capacitor 14 is set by the controller 15.

The controller 15 controls the output frequency and the output voltage of the AC power source 1 and controls the electrostatic capacitance of the capacitor 14. Also, the controller 15 executes data communication with the power receiver 500 through the antenna 16.

The power transmitting apparatus 80 as described above transmits, to the primary-side resonant coil 12 through magnetic induction, the AC power supplied from the AC power source 1 to the primary-side coil 11, and transmits the electric power from the primary-side resonant coil 12 to the secondary-side resonant coil 110 of the power receiver 500 through magnetic field resonance.

Next, the secondary-side resonant coil 110 included in the power receiver 500 will be described. Here, in the description of the embodiment, the resonance frequency is 6.78 MHz, for example.

The secondary-side resonant coil 110 has a resonance frequency equal to that of the primary-side resonant coil 12, and is designed to have a very high Q factor. The secondary-side resonant coil 110 includes a resonant coil part 111, and terminals 112X and 112Y. Here, although the resonant coil part 111 is substantially equivalent to the secondary-side resonant coil 110, a configuration, in which the terminals 112X and the 112Y are provided on both ends of the resonant coil part 111, is treated as the secondary-side resonant coil 110.

In the resonant coil part 111, the capacitor 115 for adjusting the resonance frequency is inserted in series. Further, the adjuster 530 is coupled in parallel with the capacitor 115. Further, the terminals 112X and 112Y are provided on both ends of the resonant coil part 111. The terminals 112X and 112Y are coupled to the rectifier circuit 120. The terminals 112X and 112Y are examples of a first terminal and a second terminal, respectively.

The secondary-side resonant coil 110 is coupled to the rectifier circuit 120 without introducing a secondary-side coil. In a state where resonance generation is enabled by the adjuster 530, the secondary-side resonant coil 110 outputs, to the rectifier circuit 120, the AC power transmitted from the primary-side resonant coil 12 of the power transmitter 10 through the magnetic field resonance.

The capacitor 115 is inserted in series with the resonant coil part 111 for adjusting the resonance frequency of the secondary-side resonant coil 110. The capacitor 115 includes terminals 115X and 115Y. Further, the adjuster 530 is coupled in parallel with the capacitor 115. The capacitor 115 is an example of a first capacitor.

The rectifier circuit 120 includes four diodes 121 to 124. The diodes 121 to 124 are coupled in a bridge-like configuration, and rectify the full wave of the electric power input from the secondary-side resonant coil 110 to output the full-wave rectified power.

The adjuster 530 is coupled in parallel with the capacitor 115 in the resonant coil part 111 of the secondary-side resonant coil 110.

The adjuster 530 includes the switches 131X and 131Y, diodes 132X and 132Y, capacitors 133X and 133Y, terminals 134X and 134Y, and the capacitor 135. The switches 131X and 131Y, the diodes 132X and 132Y, the capacitors 133X and 133Y, and the terminals 134X and 134Y are similar to those of the first embodiment.

The capacitor 135 is inserted in series between the terminal 134X and a connection point 136. The connection point 136 is a point that couples one end of the switch 131X, the cathode of the diode 132X, and one end of the capacitor 133X. That is, the capacitor 135 is inserted in series with the series circuit of the switches 131X and 131Y. In other words, the capacitor 135 is inserted in series with the series circuit of the diodes 132X and 132Y, and inserted in series with the series circuit of the capacitors 133X and 133Y.

The capacitance C of LC conditions for generating resonance through magnetic field resonance in the secondary-side resonant coil 110 is set as a combined capacitance of the capacitor 135, the capacitor 115, and either the capacitor 133X or 133Y. That is, when the capacitor 135, the capacitor 115, and either the capacitor 133X or 133Y are included in the current path of the secondary-side resonant coil 110, resonance through magnetic field resonance occurs.

Note that the inductance of the conditions for generating resonance through magnetic field resonance in the secondary-side resonant coil 110 is the inductance of the secondary-side resonant coil 110.

The switches 131X and 131Y can be turned on/off in the phases opposite to each other. When the switch 131X is off and the switch 131Y is on, the power receiver 500 is in a state where a resonance current may flow in the adjuster 530 in a direction going from the terminal 134X to the terminal 134Y through the capacitor 135, the capacitor 133X, and the switch 131Y, and the resonance current may flow in the capacitor 115 from the terminal 115X to the terminal 115Y. That is, the power receiver 500 in FIG. 27 transitions to a state where the resonance current may flow in the secondary-side resonant coil 110 in the clockwise direction.

Also, when the switch 131X is on and the switch 131Y is off, the current path generated in the adjuster 530 goes from the terminal 134X to the terminal 134Y through the capacitor 135, the switch 131X, and the diode 132Y. Because this electric current path is parallel with the capacitor 115, the current stops flowing in the capacitor 115.

Therefore, when the power receiver 500 transitions from a state where the switch 131X is off, the switch 131Y is on, and hence, the resonance current flows in the secondary-side resonant coil 110 in the clockwise direction, to a state where the switch 131X is on and the switch 131Y is off, the resonance current stops occurring. This is because although the capacitor 135 is included in the current path, the resonant conditions are not satisfied with the capacitor 135 alone.

When the switch 131X is on and the switch 131Y is off, the power receiver 500 is in a state where a resonance current may flow in the adjuster 530 in a direction going from the terminal 134Y to the terminal 134X through the capacitor 133Y, the switch 131X, and the capacitor 135, and the resonance current may flow in the capacitor 115 from the terminal 115Y to the terminal 115X. That is, the power receiver 500 in FIG. 27 transitions to a state where the resonance current may flow in the secondary-side resonant coil 110 in the counterclockwise direction.

Also, when the switch 131X is off and the switch 131Y is on, the current path generated in the adjuster 530 goes from the terminal 134Y to the terminal 134X through the switch 131Y, the diode 132X, and the capacitor 135. Because this electric current path is parallel with the capacitor 115, the current stops flowing in the capacitor 115.

Therefore, when the power receiver 500 transitions from a state where the switch 131X is on, the switch 131Y is off, and hence, the resonance current flows in the secondary-side resonant coil 110 in the counterclockwise direction, to a state where the switch 131X is off and the switch 131Y is on, the resonance current stops occurring. This is because although the capacitor 135 is included in the current path, the resonant conditions are not satisfied with the capacitor 135 alone.

The adjuster 530 switches the switches 131X and 131Y as described above to switch between a state where the resonance current may be generated, and a state where the resonance current is not generated. The switches 131X and 131Y are switched by the driving signal output from the controller 150.

The frequency of the driving signal is set to the AC frequency received by the secondary-side resonant coil 110.

The switches 131X and 131Y cut off the AC current at a high frequency as described above. For example, the adjuster 530 having two FETs combined can cut off the AC current at high speed.

Note that the driving signal and operations of the adjuster 530 will be described later below with reference to FIG. 28.

The smoothing capacitor 140 is coupled to the output side of the rectifier circuit 120, and smooths the electric power, on which the full-wave rectification is performed by the rectifier circuit 120, and outputs the smoothed power as direct-current power. The output terminals 160X and 160Y are coupled to the output side of the smoothing capacitor 140. Because the negative component of AC power has been inverted into the positive component, the electric power on which the full-wave rectification has been performed by the rectifier circuit 120 can be treated as substantially AC power. However, stable DC power can be obtained by using the smoothing capacitor 140 even when ripple is included in the full wave rectified power.

Note that a line, which couples an upper side terminal of the smoothing capacitor 140 and the output terminal 160X, is a higher voltage side line, and a line, which couples a lower side terminal of the smoothing capacitor 140 and the output terminal 160Y, is a lower voltage side line.

Figure 28:
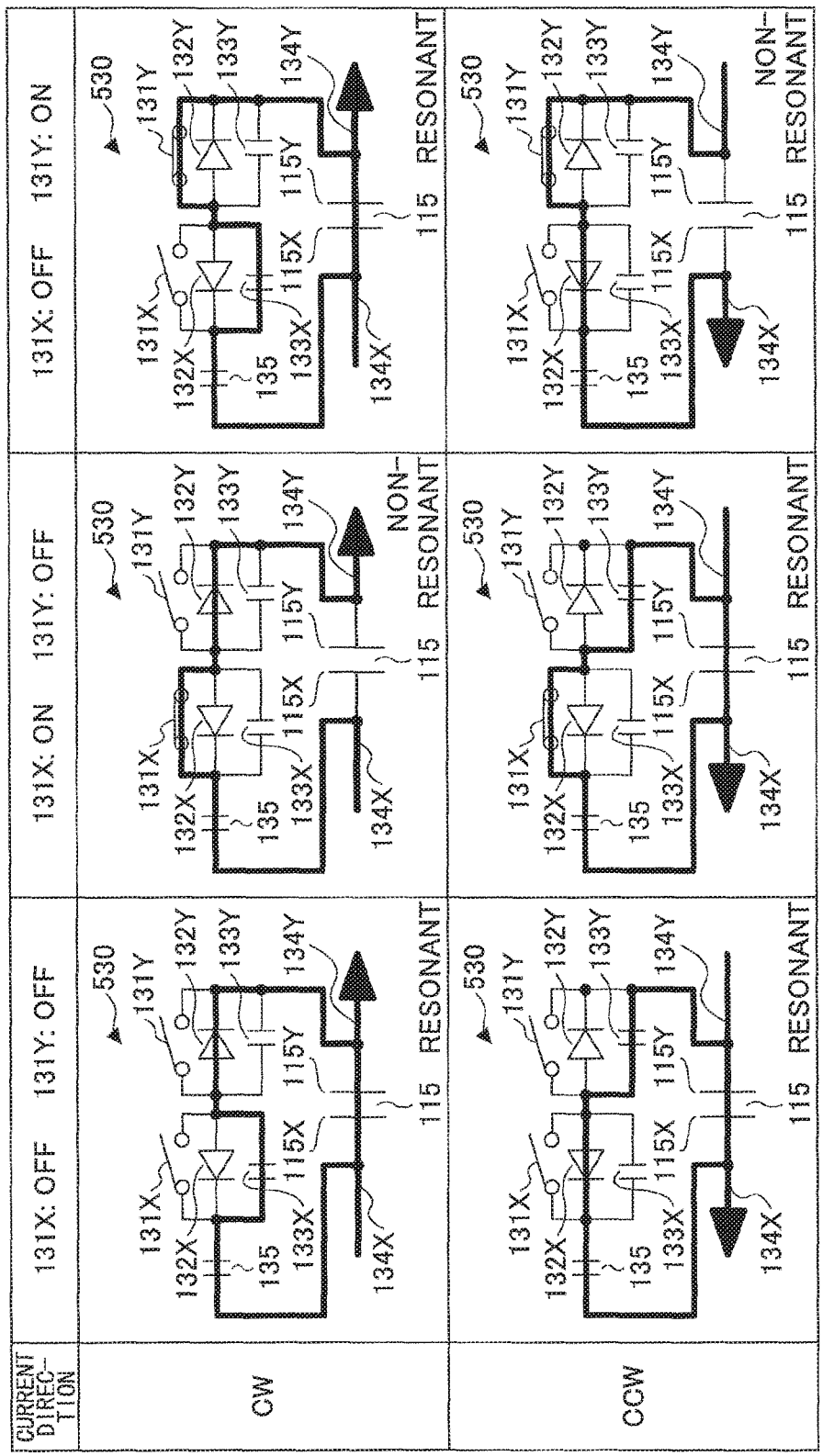
FIG. 28 is a diagram illustrating current paths in the capacitor and the adjuster.

FIG. 28 is a diagram illustrating current paths in the capacitor 115 and the adjuster 530. In FIG. 28, as in FIG. 27, an electric current direction will be referred to as the clockwise (CW) direction for an electric current flowing from the terminal 134X to the terminal 134Y through the capacitor 115 or the inside of the adjuster 530. Also, an electric current direction will be referred to as the counterclockwise (CCW) direction for an electric current flowing from the terminal 134Y to the terminal 134X through the capacitor 115 or the inside of the adjuster 530.

Further, clock signals CLK1 and CLK2 are described here in a case where the switches 131X and 131Y are P-channel FETs. The switches 131X and 131Y are turned on when the clock signals CLK1 and CLK2 are at the L level. The switches 131X and 131 are turned off when the clock signals CLK1 and CLK2 are at the H level.

First, in a case where the switches 131X and 131Y are both off and an electric current flows clockwise (CW), a resonance current flows in the direction from the terminal 134X to the terminal 134Y through the capacitor 135, the capacitor 133X, and the diode 132Y, and the resonance current flows in the capacitor 115 from the terminal 115X to the terminal 115Y. Therefore, the resonance current flows in the secondary-side resonant coil 110 in the clockwise direction.

In a case where the switches 131X and 131Y are both off and an electric current flows counterclockwise (CCW), a resonance current flows in the direction from the terminal 134Y to the terminal 134X through the capacitor 133Y, the diode 132X, and the capacitor 135, and the resonance current flows in the capacitor 115 from the terminal 115Y to the terminal 115X. Therefore, the resonance current flows in the secondary-side resonant coil 110 in the counterclockwise direction.

In a case where the switch 131X is on, the switch 131Y is off, and an electric current flows clockwise (CW), the current path generated in the adjuster 530 goes from the terminal 134X to the terminal 134Y through the capacitor 135, the switch 131X and the diode 132Y. Because this electric current path is parallel with the capacitor 115, the current stops flowing in the capacitor 115. Therefore, the resonance current does not flow in the secondary-side resonant coil 110. Note that in this case, even if the switch 131Y is turned on, the resonance current does not flow in the secondary-side resonant coil 110.

In a case where the switch 131X is on, the switch 131Y is off, and an electric current flows counterclockwise (CCW), a resonance current flows in the adjuster 530 in the direction from the terminal 134Y to the terminal 134X through the capacitor 133Y, the switch 131X, and the capacitor 135, and the resonance current flows in the capacitor 115 from the terminal 115Y to the terminal 115X. Therefore, the resonance current flows in the secondary-side resonant coil 110 in the counterclockwise direction. Note that electric current also flows in the diode 132X, which is parallel with the switch 131X.

In a case where the switch 131X is off, the switch 131Y is on, and an electric current flows clockwise (CW), a resonance current flows in the adjuster 530 in the direction from the terminal 134X to the terminal 134Y through the capacitor 135, the capacitor 133X, and the switch 131Y, and the resonance current flows in the capacitor 115 from the terminal 115X to the terminal 115Y. Therefore, the resonance current flows in the secondary-side resonant coil 110 in the clockwise direction. Note that electric current also flows in the diode 132Y, which is parallel with the switch 131Y.

In a case where the switch 131X is off, the switch 131Y is on, and an electric current flows counterclockwise (CCW), the current path generated in the adjuster 530 goes from the terminal 134Y to the terminal 134X through the switch 131Y, the diode 132X, and the capacitor 135. Because this electric current path is parallel with the capacitor 115, the current stops flowing in the capacitor 115. Therefore, the resonance current does not flow in the secondary-side resonant coil 110. Note that in this case, even if the switch 131X is turned on, the resonance current does not flow in the secondary-side resonant coil 110.

Note that the electrostatic capacitance that contributes to the resonance frequency of the resonance current is determined depending on the three capacitors of the capacitor 115, the capacitor 133X or 133Y, and the capacitor 135. Either the capacitor 133X or 133Y is included in the three capacitors. Therefore, it is desirable that the electrostatic capacitance of the capacitor 133X is equal to the electrostatic capacitance of the capacitor 133Y.

Figure 29A:
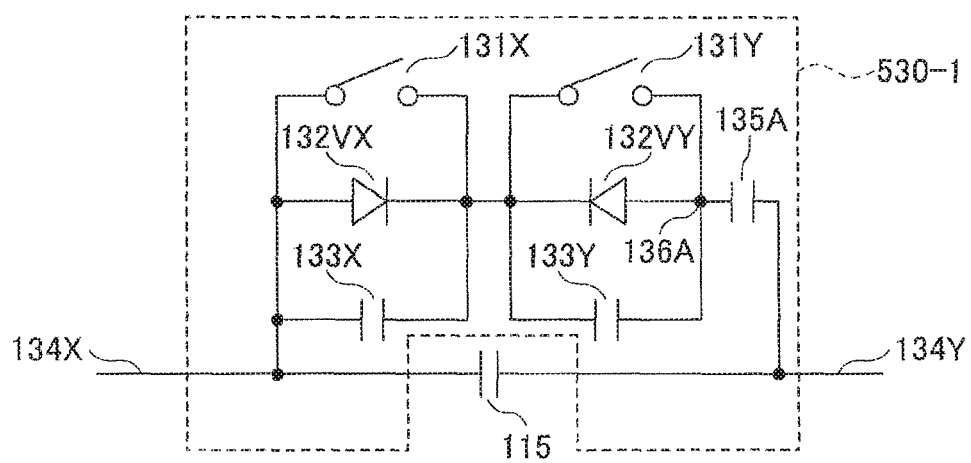
FIGS. 29A and 29B are diagrams illustrating adjusters and according to variation examples of the second embodiment.
Figure 29B:
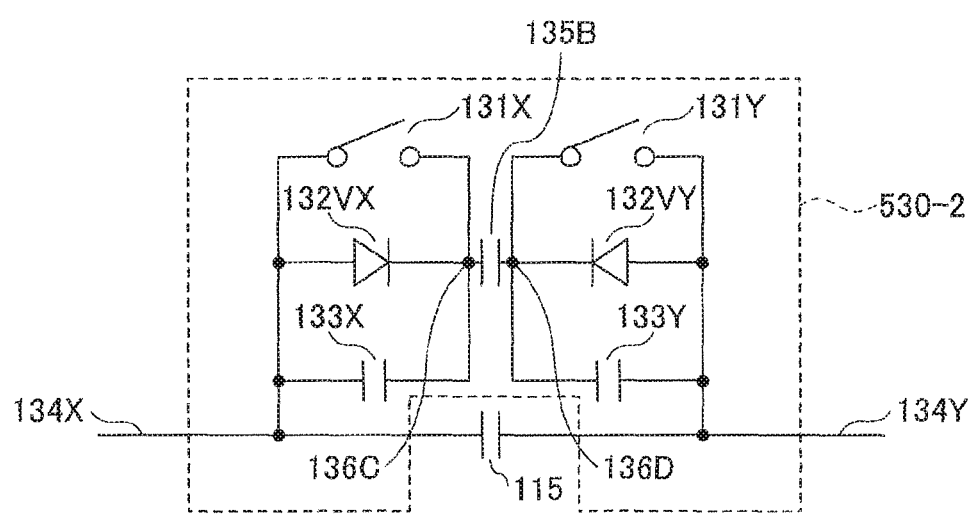

FIGS. 29A and 29B are diagrams illustrating adjusters 530-1 and 530-2 according to variation examples of the second embodiment.

The adjuster 530-1 illustrated in FIG. 29A includes the switches 131X and 131Y, the diodes 132VX and 132VY, the capacitors 133X and 133Y, the terminals 134X and 134Y, and a capacitor 135A.

The capacitor 135A is inserted in series between a connection point 136A, of the right side terminal of the switch 131Y, of the anode of the diode 132VY, and of the right side terminal of the capacitor 133Y, and the terminal 134Y.

The adjuster 530-2 illustrated in FIG. 29B includes the switches 131X and 131Y, the diodes 132VX and 132VY, the capacitors 133X and 133Y, the terminals 134X and 134Y, and a capacitor 135B.

The capacitor 135B is inserted in series between a connection point 136C, of the right side terminal of the switch 131X, of the cathode of the diode 132VX, and of the right side terminal of the capacitor 133X, and a connection point 136D, of the left side terminal of the switch 131Y, of the cathode of the diode 132VY, and of the left side terminal of the capacitor 133Y.

Further, the capacitor 135B illustrated in FIG. 29B may be added to the adjuster 530 illustrated in FIG. 27 in addition to the capacitor 135, and the capacitor 135B illustrated in FIG. 29B may be added to the adjuster 530-1 illustrated in FIG. 29A. In such a case, the resonant conditions may be set by also taking into consideration the capacitance of the capacitor 135B.

Figure 30:
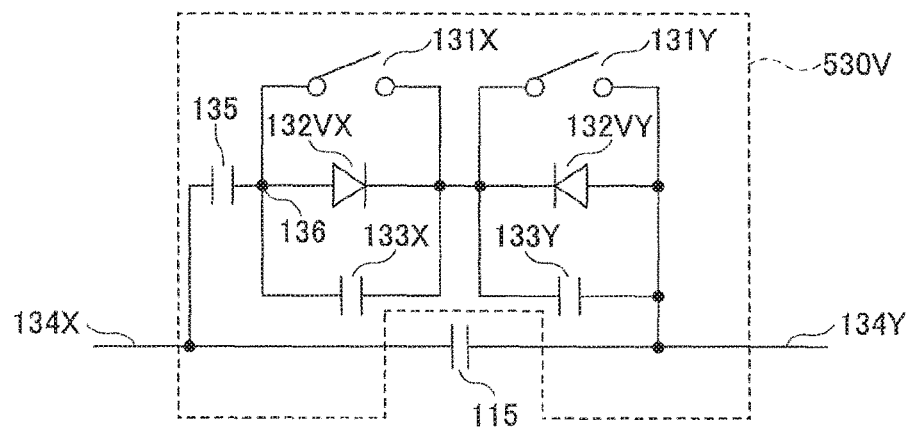
FIG. 30 is a diagram illustrating an adjuster according to a variation example of the second embodiment.

Also, the directions of the diodes 132X and 132Y of the adjuster 530 may be opposite to the directions illustrated in FIG. 27. FIG. 30 is a diagram illustrating an adjuster 530V according to a variation example of the second embodiment.

The adjuster 530V includes switches 131X and 131Y, diodes 132VX and 132VY, capacitors 133X and 133Y, terminals 134X and 134Y, and a capacitor 135. The rectification directions of the diode 132VX and 132VY are opposite to those of the diodes 132X and 132Y illustrated in FIG. 27, respectively. Other than this, the adjuster 530V is similar to the adjuster 530 illustrated in FIG. 27. Therefore, the same reference numerals are assigned to the same components, and their descriptions are omitted.

Figure 31:
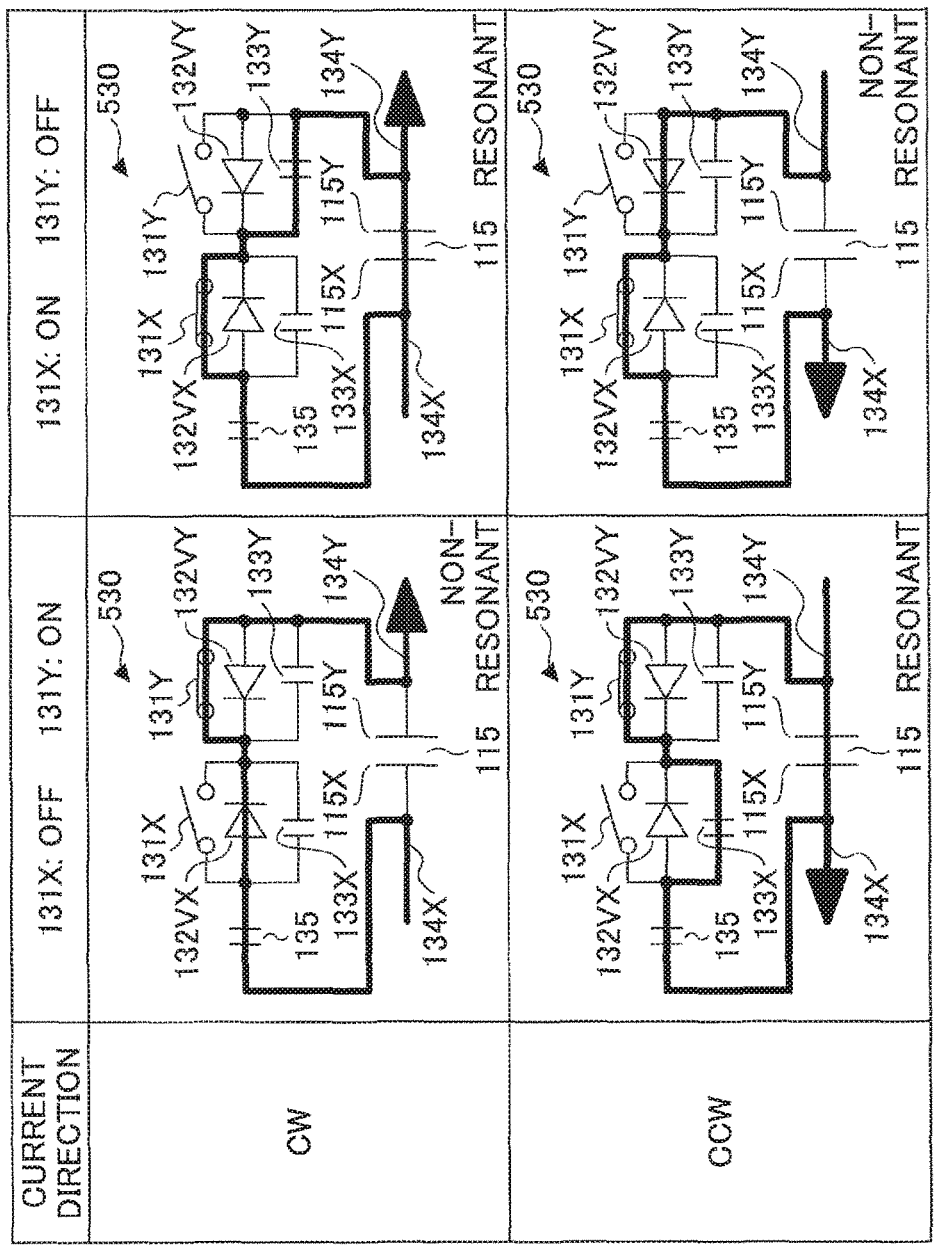
FIG. 31 is a diagram illustrating current paths in the capacitor and the adjuster.

FIG. 31 is a diagram illustrating current paths in the capacitor 115 and the adjuster 530V. In FIG. 31, an electric current direction will be referred to as the clockwise (CW) direction for an electric current flowing from the terminal 134X to the terminal 134Y through the capacitor 115 or the inside of the adjuster 530V. Also, an electric current direction will be referred to as the counterclockwise (CCW) direction for an electric current flowing from the terminal 134Y to the terminal 134X through the capacitor 115 or the inside of the adjuster 530V.

When the switch 131X is off, the switch 131Y is on, and an electric current flows clockwise (CW), the current path generated in the adjuster 530V goes from the terminal 134X to the terminal 134Y through the capacitor 135, the diode 132VX, and the switch 131Y. Because this electric current path is parallel with the capacitor 115, the current stops flowing in the capacitor 115. Therefore, the resonance current does not flow in the secondary-side resonant coil 110.

When the switch 131X is off, the switch 131Y is on, and an electric current flows counterclockwise (CCW), a resonance current flows in the adjuster 530V in the direction from the terminal 134Y to the terminal 134X through the switch 131Y, the capacitor 133X, and the capacitor 135, and the resonance current flows in the capacitor 115 from the terminal 115Y to the terminal 115X. Therefore, the resonance current flows in the secondary-side resonant coil 110 in the counterclockwise direction.

When the switch 131X is on, the switch 131Y is off, and an electric current flows clockwise (CW), a resonance current flows in the adjuster 530V in the direction from the terminal 134X to the terminal 134Y through the capacitor 135, the switch 131X, and the capacitor 133Y, and the resonance current flows in the capacitor 115 from the terminal 115X to the terminal 115Y. Therefore, the resonance current flows in the secondary-side resonant coil 110 in the clockwise direction.

When the switch 131X is on, the switch 131Y is off, and an electric current flows counterclockwise (CCW), the current path generated in the adjuster 530V goes from the terminal 134Y to the terminal 134X through the diode 132VY, the switch 131X, and the capacitor 135. Because this electric current path is parallel with the capacitor 115, the electric current stops flowing in the capacitor 115. Therefore, the resonance current does not flow in the secondary-side resonant coil 110.

As described above, according to the second embodiment, in a case where a plurality of power receivers 500 each of which has a configuration obtained by adding the capacitor 135 to the power receiver 100 of the first embodiment are present, the balance of amounts of supplied electric power can be improved.

Further, a change of the received electric power due to the periods of the beats can be reduced, and a rapid change in the received electric power can be reduced. Furthermore, it is possible to reduce a decrease of the received electric power due to the beat, and to efficiently receive the electric power.

Although examples of the power receivers and the power transmitting systems according to the embodiments of the present invention have been described above, the present invention is not limited to the embodiments specifically disclosed and various variations and modifications may be made without departing from the scope of the present invention.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A power receiver comprising:
   a secondary-side resonant coil including a resonant coil part and configured to receive electric power from a primary-side resonant coil through magnetic field resonance generated between the primary-side resonant coil and the secondary-side resonant coil;
   a capacitor inserted in series in the resonant coil part of the secondary-side resonant coil;
   a series circuit, coupled in parallel with the capacitor, of a first switch and a second switch;
   a first rectifier coupled in parallel with the first switch, the first rectifier having a first rectification direction;
   a second rectifier coupled in parallel with the second switch, the second rectifier having a second rectification direction opposite to the first rectification direction;
   a detector configured to detect the electric power received by the secondary-side resonant coil; and
   a controller configured to adjust phases of a first signal for switching on/off the first switch and of a second signal for switching on/off the second switch to adjust an amount of the electric power received by the secondary-side resonant coil.

2. The power receiver according to claim 1, wherein the controller adjusts switching frequencies of the first signal and the second signal to decrease a frequency of a beat of the electric power based on the electric power detected by the detector.

3. The power receiver according to claim 2, wherein upon the electric power being decreased to a predetermined value by the beat, the controller adjusts the phases of the first signal and the second signal such that the electric power becomes greater than or equal to the predetermined value.

4. The power receiver according to claim 3, wherein the controller repeatedly adjusts the phases for every time the electric power is decreased to the predetermined value by the beat.

5. The power receiver according to claim 3, wherein the controller adjusts the switching frequencies such that a transient response period from adjusting the phases until the electric power becomes stable is shorter than the frequency of the beat.

6. The power receiver according to claim 3, wherein, upon the electric power being decreased to the predetermined value by the beat, the controller adjusts the phases of the first signal and the second signal such that the electric power becomes a preset value that is higher than the predetermined value.

7. The power receiver according to claim 3,
wherein the controller scans the phases of the first signal and the second signal, and
wherein the controller obtains phases at which the electric power becomes maximum when scanning the phases of the first signal and the second signal, and adjusts the phases of the first signal and the second signal with reference to the phases at which the electric power becomes maximum.

8. The power receiver according to claim 1,
wherein the controller decreases the phases of the first signal and the second signal in an operation range in which the received electric power increases with respect to a decrease of the phases of the first signal and the second signal, and
wherein the controller increases the phases of the first signal and the second signal in an operation range in which the received electric power increases with respect to an increase of the phases of the first signal and the second signal.

9. The power receiver according to claim 1, further comprising:
a second capacitor inserted in series with the series circuit.

10. The power receiver according to claim 9, wherein the second capacitor is inserted in series between the resonant coil part and the first switch, between the first switch and the second switch, or between the second switch and the resonant coil part.

11. A power transmitting system comprising:
a power transmitter including a primary-side resonant coil and configured to transmit electric power; and
a power receiver configured to receive the electric power from the power transmitter,
wherein the power receiver includes
a secondary-side resonant coil including a resonant coil part and configured to receive the electric power from the primary-side resonant coil through magnetic field resonance generated between the primary-side resonant coil and the secondary-side resonant coil,
a capacitor inserted in series in the resonant coil part of the secondary-side resonant coil;
a series circuit, coupled in parallel with the capacitor, of a first switch and a second switch,
a first rectifier coupled in parallel with the first switch, the first rectifier having a first rectification direction,
a second rectifier coupled in parallel with the second switch, the second rectifier having a second rectification direction opposite to the first rectification direction,
a detector configured to detect the electric power received by the secondary-side resonant coil, and
a controller configured to adjust phases of a first signal for switching on/off the first switch and of a second signal for switching on/off the second switch to adjust an amount of the electric power received by the secondary-side resonant coil.

* * * * *